United States Patent
Shrivastava et al.

(10) Patent No.: US 7,801,913 B2
(45) Date of Patent: Sep. 21, 2010

(54) SYSTEM AND METHOD FOR QUERYING DATA FOR IMPLICIT HIERARCHIES

(75) Inventors: Saurabh Shrivastava, Fremont, CA (US); Uppili Srinivasan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 466 days.

(21) Appl. No.: 10/449,946

(22) Filed: May 30, 2003

(65) Prior Publication Data
US 2004/0243576 A1 Dec. 2, 2004

Related U.S. Application Data

(63) Continuation-in-part of application No. 09/207,160, filed on Dec. 7, 1998, now Pat. No. 6,748,374.

(51) Int. Cl.
*G06F 7/00* (2006.01)
*G06F 17/30* (2006.01)
(52) U.S. Cl. ...................................... 707/779
(58) Field of Classification Search ............ 707/102, 707/3, 100, 2, 4, 10, 5, 101, 104.1, 200, 205, 707/103 R, 103 X, 103 Y, 103 Z, 6, 705, 707/706, 713, 714, 716, 718, 736, 754, 764, 707/769, 778, 779; 715/224, 225, 234, 235, 715/243

See application file for complete search history.

(56) References Cited

U.S. PATENT DOCUMENTS

| | | | |
|---|---|---|---|
| 4,714,995 A | 12/1987 | Materna et al. | |
| 5,119,465 A | 6/1992 | Jack et al. | |
| 5,295,256 A | 3/1994 | Bapat | |
| 5,403,639 A | 4/1995 | Belsan et al. | |
| 5,442,780 A | 8/1995 | Takanashi et al. | |
| 5,454,106 A | 9/1995 | Burns et al. | |
| 5,471,613 A | 11/1995 | Banning et al. | |
| 5,499,371 A | 3/1996 | Henninger et al. | |
| 5,519,859 A * | 5/1996 | Grace | 707/3 |

(Continued)

OTHER PUBLICATIONS

Haywood et al., A Practical Hierarchical Model of Parallel Computation, Parallel and Distributed Processing, 1991. Proceedings of the Third IEEE Symposium on, Dec. 2-5, 1991, pp. 18-25.*

(Continued)

*Primary Examiner*—Greta L Robinson
(74) *Attorney, Agent, or Firm*—Vista IP Law Group, LLP.

(57) ABSTRACT

A method, system, and article of manufacture for querying an implicit hierarchy is disclosed. According to one approach, implicit hierarchies can be queried by accessing the relevant catalog tables for the attribute relevant to the query. Each identified entry in the relevant catalog table is followed through its implied hierarchical chains until all relevant entries have been identified. The catalog table containing the normalized form of the DN for each user can be consulted to identify the entry identifier for each entry corresponding to implicit hierarchy being queried, which can be searched in the appropriate catalog table to search the chain of entries for the implied hierarchy. In an approach, one or more templates may be used to generate a query language statement to perform the query upon the implicit hierarchy.

44 Claims, 25 Drawing Sheets

U.S. PATENT DOCUMENTS

| | | | |
|---|---|---|---|
| 5,572,673 A | 11/1996 | Shurts | |
| 5,615,362 A | 3/1997 | Jensen et al. | |
| 5,625,801 A | 4/1997 | Fukuya | |
| 5,664,173 A | 9/1997 | Fast | |
| 5,687,366 A | 11/1997 | Harvey et al. | |
| 5,706,506 A | 1/1998 | Jensen et al. | |
| 5,717,911 A | 2/1998 | Madrid et al. | |
| 5,752,025 A | 5/1998 | Shakib et al. | |
| 5,778,354 A | 7/1998 | Leslie et al. | |
| 5,778,370 A | 7/1998 | Emerson | |
| 5,799,306 A | 8/1998 | Sun et al. | |
| 5,802,524 A | 9/1998 | Flowers et al. | |
| 5,806,074 A | 9/1998 | Souder et al. | |
| 5,809,502 A | 9/1998 | Burrows | |
| 5,819,086 A | 10/1998 | Kroenke | |
| 5,875,446 A | 2/1999 | Brown et al. | |
| 5,884,324 A | 3/1999 | Cheng et al. | |
| 5,897,634 A | 4/1999 | Attaluri et al. | |
| 5,937,409 A | 8/1999 | Wetherbee | |
| 5,937,414 A | 8/1999 | Souder et al. | |
| 5,963,932 A | 10/1999 | Jakobsson et al. | |
| 5,995,999 A | 11/1999 | Bharadhwaj | |
| 6,009,422 A | 12/1999 | Ciccarelli | |
| 6,012,067 A | 1/2000 | Sarkar | |
| 6,016,499 A | 1/2000 | Ferguson | |
| 6,029,178 A | 2/2000 | Martin et al. | |
| 6,047,284 A | 4/2000 | Owens et al. | |
| 6,052,681 A | 4/2000 | Harvey | |
| 6,058,401 A | 5/2000 | Stamos et al. | |
| 6,078,924 A | 6/2000 | Ainsbury et al. | |
| 6,078,925 A | 6/2000 | Anderson et al. | |
| 6,085,188 A | 7/2000 | Bachmann et al. | |
| 6,122,258 A | 9/2000 | Brown | |
| 6,122,630 A | 9/2000 | Strickler et al. | |
| 6,131,098 A | 10/2000 | Zellweger | |
| 6,134,542 A | 10/2000 | Rustige | |
| 6,134,559 A | 10/2000 | Brumme et al. | |
| 6,154,743 A | 11/2000 | Leung et al. | |
| 6,163,776 A | 12/2000 | Periwal | |
| 6,178,416 B1 | 1/2001 | Thompson et al. | |
| 6,189,000 B1 | 2/2001 | Gwertzman et al. | |
| 6,199,062 B1* | 3/2001 | Byrne et al. | 707/3 |
| 6,301,589 B1 | 10/2001 | Hirashima et al. | |
| 6,338,092 B1 | 1/2002 | Chao et al. | |
| 6,356,913 B1 | 3/2002 | Chu et al. | |
| 6,366,934 B1* | 4/2002 | Cheng et al. | 715/513 |
| 6,412,017 B1 | 6/2002 | Straube et al. | |
| 6,421,675 B1 | 7/2002 | Ryan et al. | |
| 6,453,310 B1 | 9/2002 | Zander | |
| 6,530,072 B1* | 3/2003 | Hagerman et al. | 716/18 |
| 6,587,856 B1 | 7/2003 | Srinivasan et al. | |
| 6,601,064 B1 | 7/2003 | Nag et al. | |
| 6,615,223 B1 | 9/2003 | Shih et al. | |
| 6,748,374 B1* | 6/2004 | Madan et al. | 707/3 |
| 6,823,338 B1* | 11/2004 | Byrne et al. | 707/9 |
| 6,834,286 B2 | 12/2004 | Srinivasan et al. | |
| 6,999,959 B1 | 2/2006 | Lawrence et al. | |
| 2001/0034733 A1* | 10/2001 | Prompt et al. | 707/102 |
| 2002/0143943 A1* | 10/2002 | Lee et al. | 709/225 |
| 2004/0199524 A1* | 10/2004 | Rys et al. | 707/100 |
| 2005/0165807 A1 | 7/2005 | Srinivasan et al. | |

OTHER PUBLICATIONS

"Referrals Within the LDAPv2 Protocol", Aug. 1996, pp. 1-4, http://umich.edu/~dirsvcs/ldap/doc/other/ldap-ref.html.

Ein-Dor, Phillip et al., "Natural Language Access to Multiple Databases: A Model and a Prototype", Journal of Management Information Systems, Summer 1995, vol. 12, No. 1, pp. 171-197.

Howes, T. et al., "A Scalable, Deployable Directory Service Framework for the Internet", Aug. 1995, pp. 1-2, http://info.isoc.org/HMP/PAPER/173/abst.html.

Howes, T. et al., "An LDAP URL Format", Jun. 1996, pp. 1-4, http://umich.edu/~dirsvcs/ldap/doc/rfc/rfc1959.html.

Howes, T. et al., "The LDAP Application Program Interface", Aug. 1995, pp. 1-20, http://umich.edu/~dirsvcs/ldap/doc/rfc/rfc1823.txt.

Howes, T. et al., "The String Representation of Standard Attribute Syntaxes", Mar. 1995, pp. 1-11, http://www.umich.edu/~dirsvcs/idap/doc/rfc/rfc1778.txt.

Howes, T., "A String Representation of LDAP Search Filters", Dec. 1993, pp. 1-3, http://www.umich.edu/~dirsvcs/ldap/doc/rfc/rfc1558.txt.

Innosoft International, Inc., "LDAP FAQ", Jun. 1997, pp. 1-7, http://www.cirtical-angle.com/ldapworld/ldapfaq.html.

Innosoft International, Inc., "Lightweight Directory Access Protocol (Version 3) Specifications", 1996-1998, pp. 1-3, http://critical-angle.com/ldapworld/ldapv3.html.

Kille, S., "A String Representation of Distinguished Names", Mar. 1995, pp. 1-8, http://www.umich.edu/~dirsvcs/ldap/doc/rfc/rfc1779.txt.

Microsoft Press Computer Dictionary, Microsoft Press, Third Edition, p. 392.

Ozsoyoglu, Gultekin et al., "Query Processing Techniques in the Summary-Table-by-Example Database Query Language", ACM Transactions on Database Systems, vol. 14, No. 4, Dec. 1989, pp. 526-573.

Yeong, W. et al., "Lightweight Directory Access Protocol", Mar. 1995, pp. 1-20, http://www.umich.edu/~dirsvcs/ldap/doc/rfc/rfc1777.txt.

Young, A., "Connection-less Lightweight Directory Access Protocol", Jun. 1995, pp. 1-8.

* cited by examiner

Attribute Store Table

| EID | AttrName | AttrVal | AttrKind |
|---|---|---|---|
| 96 | Org. Name | Oracle | User |
| 97 | Dept. Name | Administration | User |
| 97 | State | CA | User |
| 98 | Dept. Name | Sales | User |
| 98 | State | NY | User |
| 99 | Dept. Name | R & D | User |
| 99 | State | CA | User |
| 100 | First name | John | User |
| 100 | Last name | Doe | User |
| 100 | Tel. No. | 555-1111 | User |
| 100 | Manager | Larry Founder | User |
| 100 | State | CA | User |
| 101 | First name | Jim | User |
| 101 | Last name | Smith | User |
| 101 | Tel. No. | 555-2222 | User |
| 101 | Manager | John Doe | User |
| 101 | State | NY | User |
| 102 | First name | Joe | User |
| 102 | Last name | Jones | User |
| 102 | Tel. No. | 555-3333 | User |
| 102 | Manager | Jim Smith | User |
| 102 | State | CA | User |
| 103 | First name | Larry | User |
| 103 | Last name | Founder | User |
| 103 | Tel. No. | 555-4444 | User |
| 103 | State | CA | User |
| 100 | Modifiation Timestamp | 01/01/97 | Operational |
| 101 | Modification Timestamp | 07/01/97 | Operational |
| 102 | Modification Timestamp | 07/30/98 | Operational |
| 103 | Modification Timestamp | 01/01/98 | Operational |

| | EID | AttrName | AttrVal | AttrKind |
|---|---|---|---|---|
| | . . . | . . . | . . . | . . . |
| 416 | 100 | First name | John | User |
| 418 | 100 | Last name | Doe | User |
| 420 | 100 | Tel. No. | 555-1111 | User |
| 422 | 100 | Manager | Larry Founder | User |
| 423 | 100 | State | CA | User |
| 446 | 100 | Modification Timestamp | 01/01/97 | Operational |
| 502 | 2 | Attribute _Type | Name="First Name" Parameter=name syntax; only one first name; | User |
| 504 | 2 | Attribute _Type | Name="Last Name" Parameter=name syntax; only one first name; | User |
| 506 | 2 | Attribute _Type | Name="Tel. No." Parameter=telephone number syntax; can have up to two. | User |
| 508 | 2 | Attribute _Type | Name="Manager" Parameter=name syntax with first and last name; can have multiple managers. | User |
| 509 | 2 | Attribute_Type | Name="State" Parameter=State syntax; only one state | User |
| 510 | 2 | Attribute _Type | Name="Modification Timestamp" Parameter=date syntax; only one modification timestamp. | User |
| 512 | 2 | Object classes | Name="Person"; Mandatory Attr= "First Name", "Last Name", "Modification Timestamp"; Optional Attr= "Tel.No.", "Manager", "State" | User |
| 514 | 100 | Object class | Person | User |
| | . . . | . . . | . . . | . . . |

Last Name Catalog Table

| EID | AttrValue |
|-----|-----------|
| 100 | Doe |
| 103 | Founder |
| 102 | Jones |
| 101 | Smith |

Fig. 6A

First Name Catalog Table

| EID | AttrValue |
|-----|-----------|
| 101 | Jim |
| 100 | Joe |
| 102 | John |
| 103 | Larry |

Fig. 6B

Telephone Number Catalog Table

| EID | AttrValue |
|-----|-----------|
| 100 | 5551111 |
| 101 | 5552222 |
| 102 | 5553333 |
| 103 | 5554444 |

Fig. 6C

Manager Catalog Table

| EID | AttrValue |
|-----|-----------|
| 102 | joe jones |
| 101 | john doe |
| 100 | larry founder |

Fig. 6D

State Catalog Table

| EID | AttrValue |
|---|---|
| 97 | CA |
| 98 | NY |
| 99 | CA |
| 100 | CA |
| 101 | NY |
| 102 | CA |
| 103 | CA |

Fig. 6E

Distinguished Name Table

| EID | RDN | ParentDN |
|---|---|---|
| 96 | Oracle | |
| 97 | Administration | Oracle |
| 98 | Sales | Oracle |
| 99 | R&D | Oracle |
| 100 | John Doe | Oracle.R&D |
| 101 | Jim Smith | Oracle.R&D |
| 102 | John Jones | Oracle.Sales |
| 103 | Larry Founder | Oracle.Administrative |

Attribute Store Table

| EID | AttrName | AttrVal |
|---|---|---|
| 157 | dn | cn=Tom, c=US, o=Foo |
| 157 | manager | cn=Harry, c=US, o=Foo |
| 157 | email | Tom@Foo |
| 159 | dn | cn=Harry, c=US, o=Foo |
| 159 | email | Harry@Foo |
| 161 | dn | cn=Joe, c=Japan, o=Foo |
| 161 | manager | cn=Tom, c=US, o=Foo |
| 161 | email | Joe@Foo |
| 163 | dn | cn=Group B, c=Japan, o=foo |
| 165 | dn | cn=Group A, c=US, o=foo |
| 163 | group member | cn=Group A, c=US, o=foo |
| 163 | group member | cn=Harry, c=US, o=Foo |
| 165 | group member | cn=Tom, c=US, o=Foo |
| 165 | group member | cn=Joe, c=Japan, o=Foo |

Fig. 13

Email Catalog Table

| EID | AttrValue |
|---|---|
| 157 | tom@foo |
| 159 | harry@foo |
| 161 | joe@foo |

Fig. 14A

Manager Catalog Table

| EID | AttrValue |
|---|---|
| 157 | cn=harry, c=us, o=foo |
| 161 | cn=tom, c=us, o=foo |

Fig. 14B

Normalized DN Catalog Table

| EID | AttrValue |
|---|---|
| 157 | cn=tom, c=us, o=foo |
| 159 | cn=harry, c=us, o=foo |
| 161 | cn=joe, c=japan, o=foo |
| 163 | cn=groupb, c=japan, o=foo |
| 165 | cn=groupa, c=us, o=foo |

Fig. 14C

Group Catalog Table

| EID | AttrValue |
|---|---|
| 163 | cn=groupa, c=us, o=foo |
| 163 | cn=harry, c=us, o=foo |
| 165 | cn=tom, c=us, o=foo |
| 165 | cn=joe, c=japan, o=foo |

SYSTEM AND METHOD FOR QUERYING DATA FOR IMPLICIT HIERARCHIES

CROSS-REFERENCE TO RELATED APPLICATIONS

This application is a continuation-in-part of U.S. application Ser. No. 09/207,160, filed on Dec. 7, 1998 now U.S. Pat. No. 6,748,374, which is hereby incorporated by reference in its entirety for all purposes as if fully set forth herein.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND AND SUMMARY

The present invention is related to the access and storage of data having implicit hierarchies. An example of data that may be hierarchically stored and accessed is directory information based on the Lightweight Directory Access Protocol ("LDAP"). LDAP is a directory protocol that was developed at the University of Michigan, originally as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain directory information.

LDAP directory systems are normally organized in a structure having entries (i.e., objects) organized in the form of a tree, which is referred to as a directory information tree ("DIT"). A unique name or ID (which is commonly called a "distinguished name" or "DN") identifies each LDAP entry in the DIT. An LDAP entry is a collection of one or more entry attributes. Each entry attribute has a "type" and one or more "values." Each entry belongs to one or more object classes.

If structured properly, a DIT represents an explicit hierarchy. Such a DIT only represent a single hierarchical relationship among directory entries. However, each entry in the DIT has several attributes and values of some of these attributes may represent additional hierarchical relationships among these directory entries built on different criterias and thus creating an implicit hierarchies which are not reflected in the DIT structure in which these entries exist. For example, an enterprise may choose to represent its users based on their geographical locations. This enterprise may also have an organizational structure or organizational reporting structure that is not geographically based, and which is represented as attribute data. In such a case, the geographically-based DIT structure does not show the organizational hierarchy. The organization structure which is represented as an attribute values of these entries thus forms an implicit hierarchy in the LDAP data.

For example, consider the DIT 151a of FIG. 1A, which is hierarchically organized based upon geographic location. Entry 152 is the top most level of DIT 151a and identifies the DIT portion 151a as pertaining to an organization "Foo" (o=Foo). Entry 152 is the "parent" entry for two "child" entries 153 and 155 directly beneath it in DIT 151a. Each of these entries corresponds to a geographical location. Specifically, entry 153 corresponds to the geographic location "c=US" and entry 155 corresponds to the geographic location "c=Japan".

The entries for each user/person in the Foo organization are located as child entries to either entry 153 or 155, depending upon their specific geographic location. Here, users "Tom" and "Harry" are located in the US; therefore, the individual entries 157 and 159 for these users are located beneath entry 153 (c=US) in DIT 151a. User "Joe" is located in Japan; therefore, the individual entry 161 for this user is located beneath the entry 155 (c=Japan) in DIT 151a. The distinguished name ("DN") for cn=Tom would therefore be "cn=Tom, c=US, o=Foo" and the distinguished name for cn=Harry would be "cn=Harry, c=US, o=Foo". The distinguished name for Joe is "cn=Joe, c=Japan, o=Foo".

Based upon the organization structure for their enterprise, each person also has a manager within the organization Foo. The organizational structure for this enterprise is shown in FIG. 1B. Here, Harry is the manager of Tom, and Tom is the manager of Joe. Assume that the manager for each individual is listed as an attribute associated with the entry for that individual, as shown in FIG. 1A. The explicit hierarchy of DIT 151a of FIG. 1A does not correspond or show the implied hierarchy of FIG. 1B, even though the manager attribute information for the entries 157, 159, and 161 correspond to this implied hierarchy.

The same scenario applies to Group objects as well. "Group A" can be a member of "Group B". A user who is a member of "Group A" is also a member of "Group B". The membership of "Group A" into "Group B" represents a implicit hierarchy. However, the same is not reflected in the place that these groups are created in the DIT.

To illustrate, consider the DIT 151b of FIG. 2A, which shows an additional two groups Group A and Group B, which are identified as entries 163 and 165, respectively. As before, DIT 151b is organized along geographical boundaries. Based upon the listed attributes for the entries in DIT 151b, Group A is a member of Group B (entry 165). User Harry is a member of Group B (entry 159). Users Tom and Joe are members of Group A (entries 157 and 161). Therefore, the memberships of the Groups are organized in the implied hierarchy shown in FIG. 2B and are not explicitly shown in the DIT 151b.

Directory protocols, such as the LDAP Protocol, do not natively have provisions for clients to queries and resolve implicit hierarchies. This type of functionality is becoming more and more important as products start using such directories for purposes like building a Email distribution list or using groups for application authorizations where the assertion used for setting up objects like distribution list are hierarchical and the client needs to resolve the entire hierarchy. The current limitations in the protocols make it very inefficient for clients to query such implicit hierarchical data. For example, a client cannot ask for the "mail" attribute of all users under a particular manager and get mail attributes for all its direct and in-direct reports until the DIT structure represents such a hierarchy, but then the DIT structure can represent only one hierarchy and hence results in limitations when attempting to query for an implicit hierarchy. The existing LDAP Search semantics allow one to get "mail" attributes for direct reports only. The client then has to query for the direct reports of all entries returned and continue this recursively till all the entries have been examined. This results in performing several queries on the LDAP server. This certainly is not a scalable solution and has performance implications.

The present invention provides a method, system, and article of manufacture for querying an implicit hierarchy. According to one embodiment of the invention, implicit hierarchies can be queried by accessing the relevant catalog tables for the attribute relevant to the query. Each identified entry in the relevant catalog table is followed through its implied hierarchical chains until all relevant entries have been identified. The catalog table containing the normalized form of the DN can be consulted to identify the entry identifier for each entry corresponding to implicit hierarchy being queried, which can be searched in the appropriate catalog table to search the chain of entries for the implied hierarchy. In an embodiment, one or more templates may be used to generate a query language statement to perform the query upon the implicit hierarchy.

Further details of aspects, objects, and advantages of the invention are described below in the detailed description, drawings, and claims. Both the foregoing general description and the following detailed description are exemplary and explanatory in nature, and serve to explain the principles of the invention.

BRIEF DESCRIPTION OF THE DRAWINGS

FIG. 4 shows an example attribute-store table.

FIG. 5 depicts an attribute-store table having metadata entries.

FIGS. 6A, 6B, 6C, 6D and 6E depict examples of catalog tables.

FIG. 7 illustrates a distinguished name table.

FIG. 13 shows an attribute store table corresponding to the DIT of FIG. 2A.

FIGS. 14A-D show catalog tables corresponding to the attribute store table of FIG. 13.

DETAILED DESCRIPTION

The present invention provides a method, system, and article of manufacture for querying an implicit hierarchy.

According to one embodiment of the invention, implicit hierarchies can be queried by accessing the appropriate catalog tables for the attribute relevant to the query. Each identified entry in the relevant catalog table is followed through its implied hierarchical chains until all relevant entries have been identified. The catalog table containing the normalized form of the DN can be consulted to identify the entry identifier for each entry corresponding to implicit hierarchy being queried, which can be searched in the appropriate catalog table to search the chain of entries for the implied hierarchy. In an embodiment, one or more templates may be used to generate a query language statement to perform the query upon the implicit hierarchy.

As described above, the native LDAP Search interface allows one to query only the first level hierarchies (whether or not an implicit hierarchy is being queried). As such, if a query is posed against an implicit hierarchy, clients have to perform several queries to completely traverse the hierarchy. This is certainly not a scalable solution as it involves several roundtrips to a server and involves as many search operations as well. Also, all the leaf level queries return no results but still involve a round trip to the server and the cost of executing a query. With the presently described approach according to one embodiment, clients will issue only a single query and yet be able to read information about all the nodes in the implicit hierarchy. The storage architecture presented above is utilized in one embodiment to facilitate the process for querying an implicit hierarchy.

Storage Architecture

Before describing the process for querying an implicit hierarchy, the present section will disclose an approach for storing information (as well as other object-oriented data) into a relational database system. It is noted that the present approach is only an example of a usable storage architecture; other storage approaches may also be employed in conjunction with the present invention.

Figure 3:
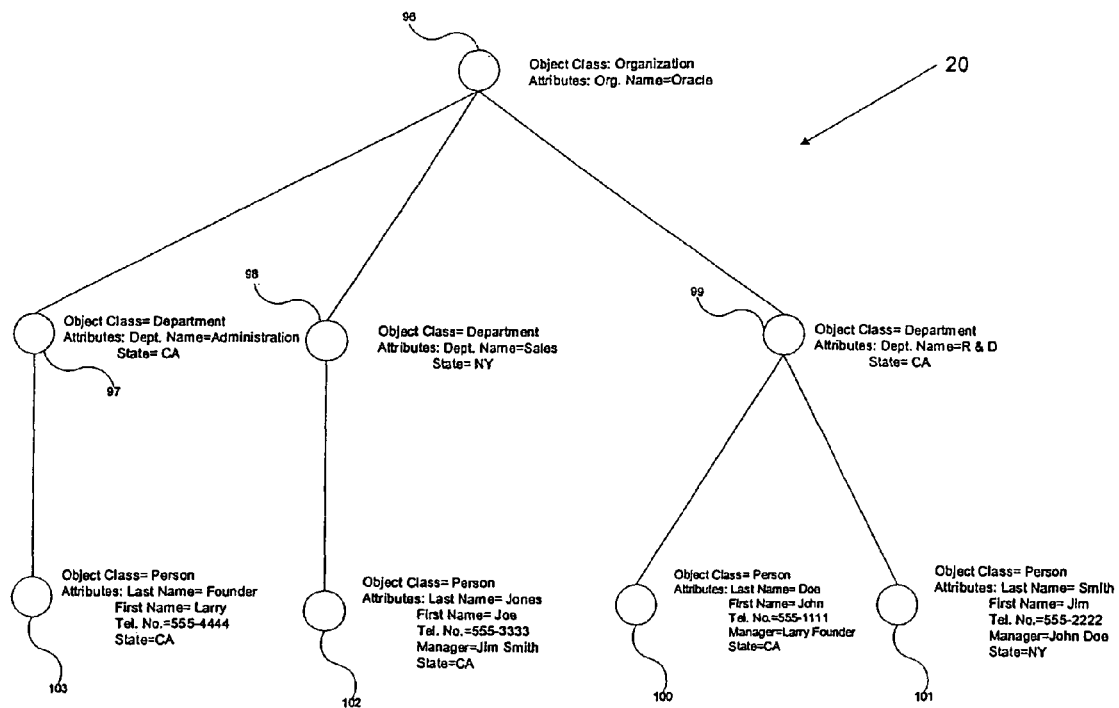
FIG. 3 depicts an example DIT.

To explain the example storage architecture, reference is now made to the example hierarchical tree of directory entities shown in FIG. 3. Entry 96 is the top most level of DIT 20 and is of object class "organization" having an attribute type "Org. Name" with an attribute value of "Oracle". Entry 96 is the "parent" entry for three "child" entries (97, 98, and 99) directly beneath it in DIT 20. Entries 97, 98, and 99 are objects of object class "Department" each having attributes "Dept. Name" and "State." Entry 97 has an attribute type "Dept. Name" having a value of "Administration" and an attribute type "State" with the value "CA". Entry 98 has an attribute "Dept. Name" with the value "Sales" and an attribute type "State" with an attribute value "NY". Entry 99 has an attribute type "Dept. Name" with an attribute value "R&D" and an attribute type "State" with a value of "CA".

Entry 103 is a child entry of entry 97. Entry 103 represents an object of class "Person" having the following attribute type-value pairs: (1) attribute type "Last Name" with a value of "Founder"; (2) attribute type "First Name" with a value of "Larry"; (3) attribute type "Tel. No." with a value of "555-4444"; and (4) attribute type "State" with a value of "CA".

Entry 102 is a child entry of entry 98. Entry 102 represents an object of class "Person" having the following attribute type-value pairs: (1) attribute type "Last Name" with a value of "Jones"; (2) attribute type "First Name" with a value of "Joe"; (3) attribute type "Tel. No." with a value of "555-3333"; (4) attribute type "Manager" having the value of "Jim Smith"; and (5) attribute type "State" having the value "CA". Note that entries 102 and 103 are both members of object class Person, but entry 102 has more listed object attributes than entry 103. In many object-oriented systems, objects that are members of the same object class may share a common set of possible object attributes, but some members of the class may not necessarily have values for some of the possible attributes. In this example, entry 103 does not have a value for attribute type "Manager" while entry 102 does have a value for this attribute.

Entries 100 and 101 are child entries of entry 99. Entries 100 and 101 are both members of object class "Person." Entry 100 is defined by the following attribute type-value pairs: (1) attribute type "Last Name" with a value of "Doe"; (2) attribute type "First Name" with a value of "John"; (3) attribute type "Tel. No." with a value of "555-1111"; (4) attribute type "Manager" having the value of "Larry Founder"; and (5) attribute type "State" having the value "CA". Entry 101 is defined by the following attribute type-value pairs: (1) attribute type "Last Name" with a value of "Smith"; (2) attribute type "First Name" with a value of "Jim"; (3) attribute type "Tel. No." with a value of "555-2222"; and (4) attribute type "Manager" having the value of "John Doe"; and (5) attribute type "State" having the value "NY".

An embodiment of the present invention involves the implementation of a single table that comprises information describing objects and object attributes on the system. This table is hereby referred to as the "attribute_store" table. The attribute_store table in one embodiment comprises four columns having the following characteristics:

| Column Name | Datatype | Constraint | Description |
| --- | --- | --- | --- |
| EID | Number | Not null | ID for an entry |
| AttrName | Character-numeric | | Attribute ID for a particular attribute |
| AttrVal | Character-numeric | | Attribute values |
| AttrKind | Character string | Not null | Kind of Attribute (Operational, User etc.) |

FIG. 4 depicts an example of an attribute_store table 400 for entries in the DIT 20 of FIG. 3. All entries in DIT 20 are represented in attribute_store table 400, regardless of the particular object class that an entry belongs to. An entry is represented by one or more rows in table 400. A set of rows having the same EID describes the attributes for the same entry in DIT 20. Each row shown in attribute_store table 400 corresponds to a separate attribute for an entry.

Consider entry 100 from DIT 20, which is represented in attribute_store table 400 by rows 416, 418, 420, 422, 423, and 446. The combination of the contents of these rows describes the attributes of entry 100. Each row in attribute_store table 400 comprises a column that identifies that row's corresponding EID. These particular rows (416, 418, 420, 422, 423, and 446) are identified as being associated with entry 100 since all of these rows comprise the same value of 100 in their EID column. Each of these rows describes a different attribute for entry 100. For each row, the "AttrName" column identifies which object attribute is being described, and the "AttrVal" column identifies the value(s) for that attribute. For entry 100, row 416 describes attribute "First Name" having a value of "John", row 418 identifies the value "Doe" for attribute "Last Name", row 420 identifies the value "555-1111" for attribute "Tel No.", row 422 identifies the value "Larry Founder" for attribute "Manager," and row 423 identifies the value "CA" for attribute "State." Each of the other entries from DIT 20 is similarly represented by sets of one or more rows in the attribute_store table 400.

In an embodiment, the rows in attribute_store table 400 contain an "AttrKind" column. This column identifies additional system categories for the object attributes. For example, one category of attribute kinds that can be identified according to the invention refers to access and modification privileges for particular object attribute. Two examples of attribute kinds relating to access and modification privileges are "User" and "Operational" attributes. User attributes are attributes that can be modified by the user, entity or organization associated with a particular entry. Operational attributes are attributes that are maintained by the system, and thus cannot be altered or modified except by the system. For example, row 420 identifies attribute type "Tel. No." for entry 100 as being of AttrKind user, and thus the user or entity associated with entry 100 is permitted to modify this attribute value. Row 446 provides an example of an attribute type that is of attribute kind "operational" (i.e., "Modification Timestamp"). Many directory systems maintain a timestamp of the last modification time/date for each directory entry. Row 446 describes attribute "modification timestamp" for entry 100 having a value of "01/01/97." Since this attribute type is "operational," the entity or person corresponding to entry 100 is not normally permitted to modify this attribute value. In an alternate embodiment of the invention, the attribute_store table is configured without having a column for the AttrKind value.

The present approach provides an improved method for adding, modifying, and maintaining metadata in the system. In a database system, metadata refers to information that describes the data in the system. Metadata information includes data that describes the structure and parameters of the tables and data maintained in the system. To accomplish this, the present approach permits rows that define metadata, referred to as "subschema entries," to be inserted into the attribute_store table. Subschema entries allow management of the directory schema for the system without having to issue DDL commands to modify the database schema. In an embodiment, subschema entries comprise the following characteristics for columns in the attribute_store table:

| Column Name | Datatype | Constraint | Description |
| --- | --- | --- | --- |
| EID | Number | Not null | EID indicative of subschema entries |
| AttrName | Character string | Not null | Identifies the type of subschema entity being added (e.g., attribute, object class, etc.) |
| AttrVal | Encoded string | Not null | Subschema element name and parameters |
| AttrKind | Character string | Not null | Kind of subschema entry (e.g., user, Operational, etc.) |

FIG. 5 illustrates the use of subschema entries to define metadata in the system. Depicted in FIG. 5 is an attribute_store table showing selected rows that describe the attributes for entry 100 of DIT 20 (i.e., rows 416, 418, 420, 422, 423, and 446). The table of FIG. 5 also includes additional rows (rows 502, 504, 506, 508, 509, 510, 512, and 514) that describe some of the metadata associated with entry 100. In an embodiment, subschema entries that define new object classes or object attributes comprise a selected EID value that is indicative of that particular type of subschema entry. In the table of FIG. 5, rows having an ED of "2" are recognized by the system as subschema entries that define system metadata for attributes and object classes. Whenever a row is added to the attribute_store table with an EID value of 2, the system recognizes that a new metadata definition has been added. The AttrName column of a subschema entry identifies the type of subschema entity being added. In the example of FIG. 5, a subschema entry that adds a new attribute type would contain the value "Attribute_Type" in the AttrName column (i.e., rows 504, 506, 508, 509, and 510). A subschema entry that adds a new object class contains the value "Object Classes" in the AttrName column (i.e., row 512). The AttrVal column for a subschema entry describes the name and parameters of the new metadata type that is being added. The AttrKind column of the subschema entry identifies additional system kinds or categories for the object class or attribute being added.

To illustrate, consider row 506, which is a subschema entry that defines the attribute type "Tel. No." The EID column of row 506 contains the value "2", to indicate that this row is a subschema entry that is modifying the directory system metadata. The AttrName column of row 506 contains the value "Attribute_Type" to indicate that row 506 is defining an attribute type. The AttrVal column of row 506 indicates that the name of the attribute type being defined is "Tel. No."

The AttrVal column also describes the defining parameters of the new object attribute. One such parameter is the attribute encoding syntax for the allowable values for this attribute. In this example, the particular attribute encoding syntax defined in row 506 describes the syntax for information permitted to be entered in the "AttrVal" column of row 420 (since row 420 describes an attribute of the attribute type defined in row 506). The attribute coding syntax for any particular attribute can be selected to achieve desired formatting and input requirements for that attribute. In an embodiment, a set of syntax definitions can be predefined in the system, and all new attribute types added to the system must correspond to these pre-defined syntax definitions. For example, a particular attribute coding syntax called "TelephoneNumberSyntax" can be defined for encoding values for attributes types related to telephone numbers in the directory system. In a present embodiment, the standard attribute coding syntax definitions utilized in the invention are based upon standard syntaxes published for the LDAP directory protocol.

The AttrVal column of a subschema entry can also identify the quantity of values to be provided for the defined attribute type. For example, if the attribute being added is a telephone number, it is possible for some entities to have more than one telephone number. A parameter can be defined in the subschema entry that specifies a minimum or maximum number of telephone number values allowed for that attribute. Alternatively, the subschema entry could identify whether an attribute type comprises either single value, or multiple values of that attribute. These examples of parameters used for subschema entries are only exemplary; other types of attribute parameters can be employed for subschema entries within the scope of the present invention.

Subschema entries can also be utilized to define an object class. Row 512 is a subschema entry that defines the object class "Person." The EID column of row 512 has a value of "2", which identifies this row as a subschema entry that defines directory schema metadata. The AttrName column of row 512 contains the character string "ObjectClasses" to indicate that metadata for an object class is being defined. The AttrVal column provides the name of the defined object class. In row 512, the name of the defined object class is identified as "Person." Additional information is also stated in the AttrVal column to define the parameters of the object class. For example, one such parameter is the mandatory attributes of the new object class. Each member of an object class must have stated values for the mandatory attributes. In the example of row 512, the mandatory attributes of object class "Person" are attribute types "First Name", "Last Name", and "Modification Timestamp". Other parameters that may be defined are the optional attributes of the object class. Members of an object class are permitted to have no stated values for optional attributes. In row 512, the optional attributes of object class "Person" are defined to be attribute types "Tel. No." and "Manager". Row 512 also identifies the attribute kind of the object class as type "User".

Row 514 provides an example of a metadata row to define a member of an object class. In row 514, entry 100 is defined as a member of object class "Person." The EID column of row 514 contains the EID of the new object. The AttrName column identifies that a new member of an object class is being created. The AttrVal column of row 514 identifies the particular object class that the new entry is a member of. The AttrKind column identifies the kind of the new object. In this row, the new object is of attribute kind "User."

Specialized tables, referred to herein as "catalog tables", are maintained as indexes into the attribute_store table. Catalog tables provide efficient searches for objects having particular attribute values in the attribute-store table. A separate catalog table is maintained for each attribute type that is indexed. Each catalog table comprises two columns. The first column is the EID column, which identifies the EID of an entry or object having an attribute of the cataloged attribute type. The second column provides the attribute value for that corresponding EID and attribute type.

FIGS. 6A-E depict examples of catalog tables for some of the attribute types shown in attribute_store table 400. FIG. 6A depicts a catalog table that indexes the attribute type "Last Name." Each entry having an attribute of type "Last Name" is cataloged in the table of FIG. 6A. Similarly, FIG. 6B depicts a catalog table for the attribute type "First Name", FIG. 6C depicts a catalog table for the attribute type "Telephone Number", FIG. 6D depicts a catalog table for the attribute type "Manager", and FIG. 6E depicts a catalog table for the attribute type "State".

Each row of the catalog table is directed to a different entry that contains the cataloged attribute type. Each row identifies the EID of the entry of object comprising that attribute type, and the attribute value for that EID. If a new object is added to the system having an attribute of a cataloged type, then a new entry is added to the respective catalog table. If an existing object having a cataloged attribute type is deleted or the attribute for that object is deleted, then the corresponding entry in the respective catalog table is also deleted. In an embodiment, the catalog table is maintained in a sorted list of entries.

In one embodiment, catalog tables store the attribute value information in a normalized or canonical format, which is based upon matching rules established for each attribute type. Matching rules are descriptions of rules that are used to perform a query, search, sort, or comparison of attribute values. The definition of each attribute type specifies which matching rule should be used to compare its attribute values. One matching rule is specified for each type of matching (e.g., equality, substring, ordering, or approximate match) if that matching is allowed for the attribute type. The type of matching types allowed may depend on the syntax of the attribute type (e.g. ordering match may not be allowed on attribute types of syntax 'binary'). A matching rule may be used by multiple attribute types and multiple attribute syntaxes. The definition of a matching rule involves:
1. assigning an object identifier to the matching rule;
2. defining the syntax of an assertion of the matching rule;
3. specifying the different types of matches supported by the rule; and
4. defining the appropriate rules for evaluating a presented assertion with respect to target attribute values held in the directory information database;

A matching rule is used to evaluate attribute value assertions of attributes. The syntax used in the attribute value assertion (i.e. the assertion component of the attribute value assertion) is the matching rule's assertion syntax. A matching rule may apply to many different types of attributes with different attribute syntaxes. The definition of a matching rule includes a specification of the syntax of an assertion of the matching rule and the way in which values of this syntax are used to perform a match. A definition of a matching rule for use with attributes with different ASN.1 syntaxes specifies how matches are to be performed. In the preferred embodiment, the invention supports the standard LDAP protocol matching rules.

Based upon the matching rules, the normalized format for an attribute type may be significantly different from the raw value that is stored in the attribute_store table. For example, the attribute type "Tel. No." may have several permissible syntax variations for the attribute value information stored in the attribute_store table. These may include, for example, the following syntax variations being allowed for telephone numbers in the attribute_store table: (555)555-1111; (555)5551111; or 555-555-1111. However, the matching rules may indicate that only numbers are significant in a telephone number; all other characters and symbols in a telephone number are to be ignored. Thus, the canonical form of this telephone number may be stored in the catalog table in the following format: 5555551111. If a query is made against the telephone number catalog table, only numbers in the query search string (pursuant to the matching rules) will be considered when comparisons are made against entries in the catalog table.

If a query is issued which seeks a particular value for a cataloged attribute type, then the corresponding catalog table is searched for one or more EID numbers which corresponds to the requested search parameter. Thus, a database query can be issued for any particular attribute against the specific catalog table that is maintained for that attribute. The result of the database query is a list of EID numbers for objects that contains the queried attribute parameters. For example, a database query that requests every object in DIT 20 (FIG. 1) having a first name beginning with "John" will result in a search of the "First Name" catalog table (FIG. 6B) for a list of EID numbers which has a corresponding attribute "First Name" that matches with "John" (in this example, an EID value of "102" is returned). The resulting list of EID number(s) points to the entries in the attribute_store table 400 (FIG. 4) that contain the queried attribute.

Consider a query that requests every object in DIT 20 having an attribute type "State" with the value "NY". In the present approach, a search of a single catalog table, i.e., the state catalog table (FIG. 6E), finds two entries (EID 98 and EID 101) that match this query parameter. Note that these entries are members of different object classes, with entry 98 a member of object class "Department" and entry 101 a member of object class "Person". In the present approach, the number of tables (i.e., catalog tables) that need to be queried for any particular search is a function of the number of attributes within the search terms.

In an embodiment, a table is maintained to track and identify the hierarchical relationship between objects in the DIT 20. This table is hereby referred to as the "distinguished name" table. In a present embodiment, the distinguished name table comprises three columns having the following characteristics:

| Column | Datatype | Constraint | Description |
|---|---|---|---|
| EID | number | Not null | Entry ID |
| RDN | Variable character-numeric string | Not null | Relative Distinguished Name |
| ParentDN | Variable character-numeric string | Not null | Parent Distinguished Name |

A distinguished name is a unique identifier that is used to refer to an entry unambiguously in the directory system. The distinguished name of an entry can be constructed by concatenating the relative distinguished name of an entry with the distinguished name of its parent entry. The relative distinguished name of an entry is the unique identifier of an entry within its own level in the DIT. The concatenation of the entry's relative distinguished name with its parent's distinguished name constructs an identifier that is unique within the entire directory system.

FIG. 7 depicts an example of a distinguished name table 700 for the DIT 20 of FIG. 3. The EID column of the distinguished name table 700 contains the EID of an entry in the DIT 20. The RDN column contains the relative distinguished name of that the entry. The ParentDN column contains the "parent" distinguished name for that entry (i.e., the absolute path of the parent entry in the DIT 20).

In the example of FIG. 7, the relative distinguished name for EID 100 is "JohnDoe," which is a concatenation of the attributes "First Name" and "Last Name" for entry 100. The relative distinguished name provides a unique identifier for objects at the particular level of the tree that the object resides on. Other representations for the relative distinguished name of an entry may be utilized within the scope of the present invention. For example, the common name ("cn") attribute type may be employed as the relative distinguished name in standard LDAP systems.

The parent distinguished name for entry 100 is "R&D.Oracle," which is the absolute path of entry 100's parent entry in DIT 20 (i.e., entry 99). Thus, the distinguished name (and absolute path) of entry 100 is "JohnDoe.R&D.Oracle," which is the concatenation of entry 100's relative distinguished name and parent distinguished name.

Note that the parent distinguished name column in the preferred embodiment of the invention stores the pathname of the parent entries in reversed order, so that the ParentDN of entry 100 is stored as "Oracle.R&D" (rather than "R&D.Oracle"). In other words, the highest corresponding level of the tree is listed first, followed by each next-lower level of the tree until the parent node is reached. This is somewhat counter-intuitive since the parent distinguished name is stored in reverse order to its representation in the absolute path for an entry. Many conventional systems do not even store the entire pathname of an entry or of the entry's parent entry. Instead, these other systems store only the specific object/entry identifier for the entry's parent. To derive the entire path of an entry, these other systems must necessarily follow a chain of object/entry identifiers for parent entries until the root node is reached, at which point the entire pathname can be constructed.

Maintaining the full path of the parent distinguished name for an entry in a reversed format provides a significant advantage when performing subtree searches in a DIT. A subtree search is a search of an entire tree of entries beneath an arbitrary node in the DIT. To perform a subtree search in the present invention, a wildcard character is utilized to narrow the field of entries in the system to particular ones beneath the node to be searched. As an example, consider a search for all entries in DIT 20 that are in Dept.="R&D" and Organization="Oracle" which has a Tel No.="555-1111". This is a subtree search because it searches for particular entries that are in the tree of entries beneath entry 99 in DIT 20. To perform this search in the present invention, the database query that is utilized may be stated in pseudocode form as follows: "Search for any entries in the DIT where Tel. No.='555-1111' and where Parent DN='Oracle.R&D*'," in which "*" is a wildcard symbol.

By storing the paths in reversed order in the distinguished names table 700, the range of entries that must be searched for the particular telephone number condition is considerably narrowed, since the indexed values can be used to find the matching entries. In conventional systems that store paths in a forward format, the same query may require the ParentDN portion be formatted as follows: "*R&D.Oracle," in which the wildcard symbol appears to the left of the parent distinguished name. Formatting the wildcard symbol to the beginning of the search string in this manner may necessitate a full scan of the stored data. With approaches that do not maintain a full path for the entries, this type of search query cannot be used without performing multiple steps to extrapolate the full pathname of the entry or its parent.

In an approach, the result of a query against an LDAP directory system returns the requested information in a format that is ready to be sent over a network (e.g., in LDAP-compliant formats). This can be implemented by maintaining a table similar to the attribute_store table of FIG. 4, but in which the "AttrVal" column contains appropriate raw or binary values for attributes of the system entries in the desired protocol compliant formats. To provide efficient query operations, the information stored for searching, such as the information that is maintained in catalog tables, are stored in an normalized format that is optimized for querying and searching. In this way, multiple entries for a particular attribute type may be stored in various different formats while still allowing full search capabilities against the stored data.

In an alternate embodiment, the protocol compliant formats for all attributes of an object can be stored in a single row of the attribute_store table. If a query requires all attributes of an object to be retrieved, this allows the access of a single row to result in the retrieval of all attributes for that object.

Additional information about an approach for forming, maintaining, updating, and modifying this type of storage architecture is disclosed in co-pending U.S. application Ser. No. 09/206,778, filed on Dec. 7, 1998, entitled "METHOD AND SYSTEM FOR REPRESENTING AND ACCESSING OBJECT-ORIENTED DATA IN A RELATIONAL DATABASE SYSTEM, which is hereby incorporated by reference in its entirety.

Automtic SQL Generation

A system and method for automatically generating a query statement in a database query language to search for particular objects or entries in a DIT that is stored within relational tables will now be described. This approach provides a general purpose query generation engine that generates a query for any LDAP search filter of arbitrary complexity. For purposes of illustration, the specific query language used in this description is SQL (structured query language); however, it is noted that the present approach can be similarly used to generate queries in other query languages.

The present approach can be configured to generate only a single SQL statement for any LDAP search filter, regardless of the complexity of the LDAP search filter. One significant benefit of generating only a single SQL statement is that the number of requests needed to perform the search filter is reduced, thus reducing the system and network overhead involved to perform the search. Additionally, since each separate SQL statement normally has inherent costs associated with its execution (e.g., the cost of performing a parsing operation), generating only a single SQL statement for a search filter reduces the total overhead cost when compared to the generation and execution of multiple SQL statements for a search filter.

Templates can be utilized to convert an arbitrary LDAP search filter into a single SQL statement. A base template provides the basic framework for generating the SQL statement. Additional templates are used to fill in specific portions of the base template. An embodiment of the base template is as follows:

```
SELECT distinquished_name.EID, store.AttrName, store.AttrVal
    FROM distinguished_name DN, attribute_store store
    WHERE
        [FilterCondition header]
        [FilterCondition]*
        [FilterCondition closing section]
        AND ( [DNCondition])
        AND DN.EID = store.EID
        AND DN.EID >=:entryThreshold
        [AttrCondition]
    ORDER BY store.EID
```

Any LDAP search filter can be converted into a single SQL statement based upon this base template. By utilizing other subtemplates to fill in portions of this base template, the exact SQL needed to perform the search can be generated. The items enclosed by the "[]" brackets are populated using additional templates.

Conceptually, this basic template can be broken into three distinct sections. The first section can be termed the "header section" to the base template. The header section comprises the following portion of the base template:

```
SELECT distinquished_name.EID, store.AttrName, store.AttrVal
    FROM distinguished_name DN, attribute_store store
    WHERE
```

The header section of the template identifies the tables and table columns that are to be accessed to perform the SQL query. In an embodiment, the distinguished name table and the attribute_store table will always be accessed to execute the query. Thus, these two tables are specifically set forth in the base template itself.

The second section of the base template can be termed the "body section." The body section comprises the following portions of the base template:

```
[FilterCondition header]
[FilterCondition]*
[FilterCondition closing section]
```

This portion of the base template is populated with specific SQL statements that are directed to each of the search conditions in the LDAP search filter. The statement "[FilterCondition]" is a placeholder for the individual lines of SQL code that are directed to each search condition. The "*" symbol after "[FilterCondition]" indicates that the LDAP search filter may be complex enough to require multiple FilterConditions in the generated SQL statement. The FilterCondition placeholders are filled in recursively by one or more subtemplates that are used to address particular types of condition statements found in the LDAP search filter, as described in more detail below.

"[FilterCondition header]" and "[FilterCondition closing section]" refer to a matched set of values depending upon the initial operator of the filter. In an embodiment, if the initial operator is anything other than "NOT" (e.g., "AND", "OR", etc.), then [FilterCondition header] is replaced by "DN.EID IN ("and [FilterCondition closing section] is replaced by ")". If the initial operator is "NOT", then [FilterCondition header] is replaced by "NOT EXISTS (SELECT 'X' From dual WHERE DN.EID IN ("and [FilterCondition closing section] is replaced by")".

The final section of the base template can be termed the "closing section." The closing section comprises the following portion of the base template:

```
AND ( [DNCondition])
AND DN.EID = store.EID
AND DN.EID >= :entryThreshold
[AttrCondition]
ORDER BY store.EID
```

This portion of the base template contains SQL statements that combine the results of the SQL statements from the body section with particular rows from the attribute_store and distinguished name tables. In addition, this portion of the base template contains statements to filter and order/sort the results of the search query.

"[DNCondition]" is replaced depending upon the type of search being performed. If a one-level search is being performed, [DNCondition] is replaced by "DN.parentDN like :bDN". If a subtree search is being performed, [DNCondition] is replaced with "(DN.rDN like :bDN OR (DN.rDN like :rDN AND DN.parentDN like :pDN))". "ParentDN" refers to the parent distinguished names column of the distinquished_ names table. The bind variables ":rDN" ":bDN", and ":pDN" refer to the relative distinguished name, base distinguished name (i.e., distinguished name of the base of the search tree), and parent distinguished name respectively. For a subtree search, the term "DN.rDN like :bDN" matches all entries within the subtree. The term "(DN.rDN like :rDN AND DN.parentDN like:pDN)" matches the base entry of the search. Note that in a presently preferred embodiment, the distinguished name is stored in a reversed manner, so performing a subtree search results in a comparison statement such as "like 'Dept=Sales, Org.=Oracle %'" rather than "like '%Org.=Oracle, Dept.=Sales'", thus making effective use of indexes.

The statement "DN.EID>=:entryThreshold" isolates certain entries from the search. Selected EID numbers are utilized for special purposes in the attribute-store table. For example, EID "2" may be used to represent metadata entries in the attribute store table. These entries do not normally need to be returned in the course of a typical subtree or one-level search. Thus, if the system reserves EID numbers 0-999 for specialized uses, then the bind variable :entryThreshold would have a value of 1000, and only entries having an EID at or above that value would be returned by a normal subtree or one-level search.

[AttrCondition] is replaced by an empty string unless the search terms form a request for only certain attribute types to be returned. For example, if this type of search is being performed for attributes of type "u", then [AttriCondition] is replaced by "AND store.attrkind='u'" to limit the rows returned from the attribute_store table to user attributes.

The statement "DN.EID=Store.ED" provides a join operation between the distinguished names table and the attribute store table. The statement "ORDER BY store.EID" provides an ordering operation to the results of the search query to cluster the results by EID.

To illustrate, consider a query request that seeks all entries in DIT 20 (FIG. 3) beneath entry 96 in which the entry has an attribute Last_Name equal to "Smith" or in which the entry has attribute Manager that begins with the name "John" and attribute Tel_No. that begins with the numbers "555" and attribute First Name equal to "Jim". Typical LDAP search filters utilize the following condition operators and their associated symbols: AND ("&"); OR ("|"); EQUAL ("="); LESS THAN OR EQUAL TO ("<="); GREATER THAN OR EQUAL TO (">="); NOT ("!"). Thus, the LDAP search filter for this search request may be expressed as follows:

```
(|&(&(Manager="John*")(Tel No.=".555*")) (FirstName="Jim"))
(LastName="Smith"))
Base: Org.=Oracle
Scope=subtree search
```

Figure 8A:
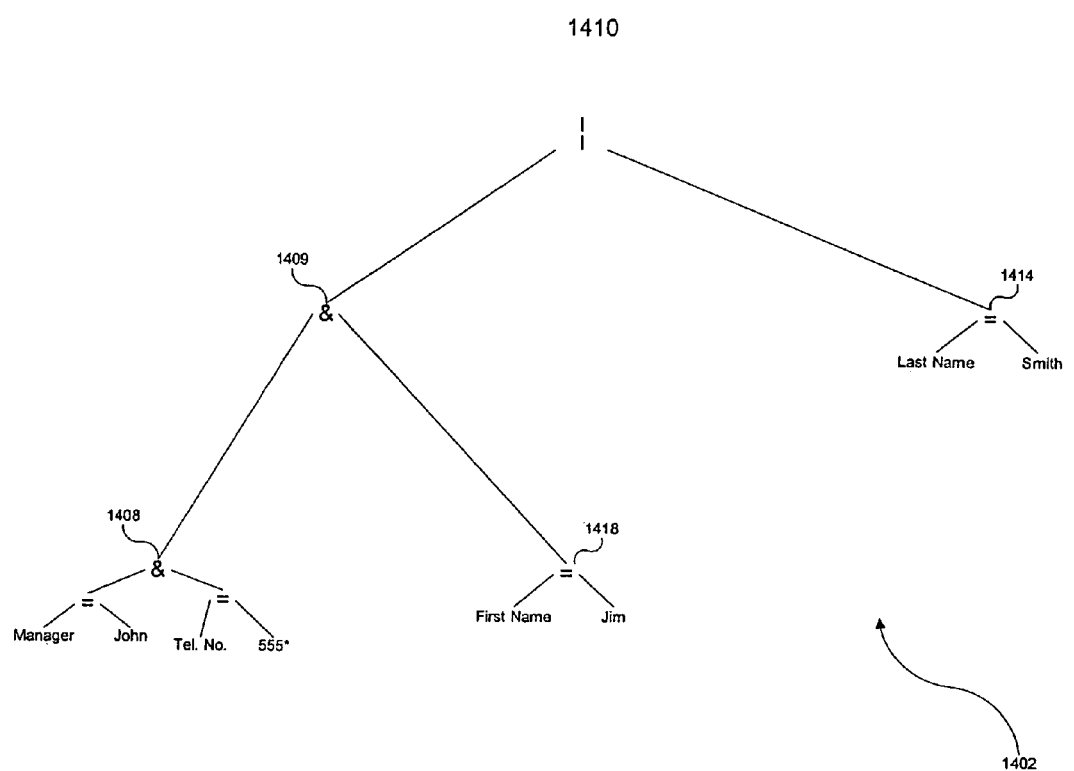
FIG. 8A illustrates an expression tree for an LDAP search filter.
Figure 9:
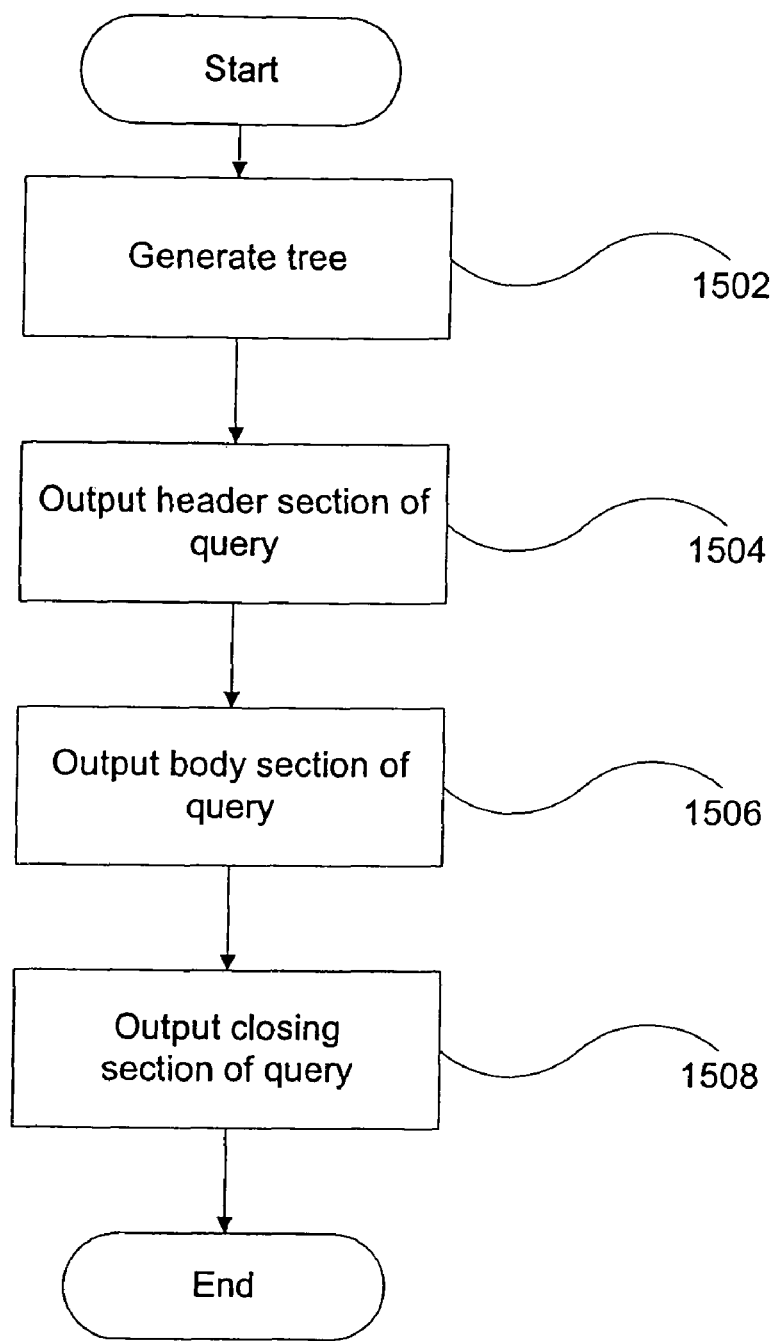
FIG. 9 is a flow diagram showing a process for generating a SQL statement for a search filter.

To generate a SQL statement for this LDAP search filter, the base template set forth above is filled in. FIG. 9 provides an overview of the process for generating a SQL statement. Referring to FIG. 9, the following process actions are performed:

1. Parse the LDAP search filter and generate an expression tree for the search filter (1502). FIG. 8A depicts such an expression tree 1402 for the LDAP search filter of the present example. Each node of expression tree 1402 is a different condition operator from the LDAP search filter. Each branch from a condition operator is an expression modified by that condition operator.
2. Generate the header section of the SQL statement (1504). This action is described in more detail in FIG. 10 and its accompanying text.
3. Generate the body portion of the SQL statement (1506). This action is described in more detail in FIGS. 11A-B and their accompanying text.
4. Generate the closing sections of the SQL statement (1508). This action is described in more detail in FIG. 12 and its accompanying text.

Figure 10:
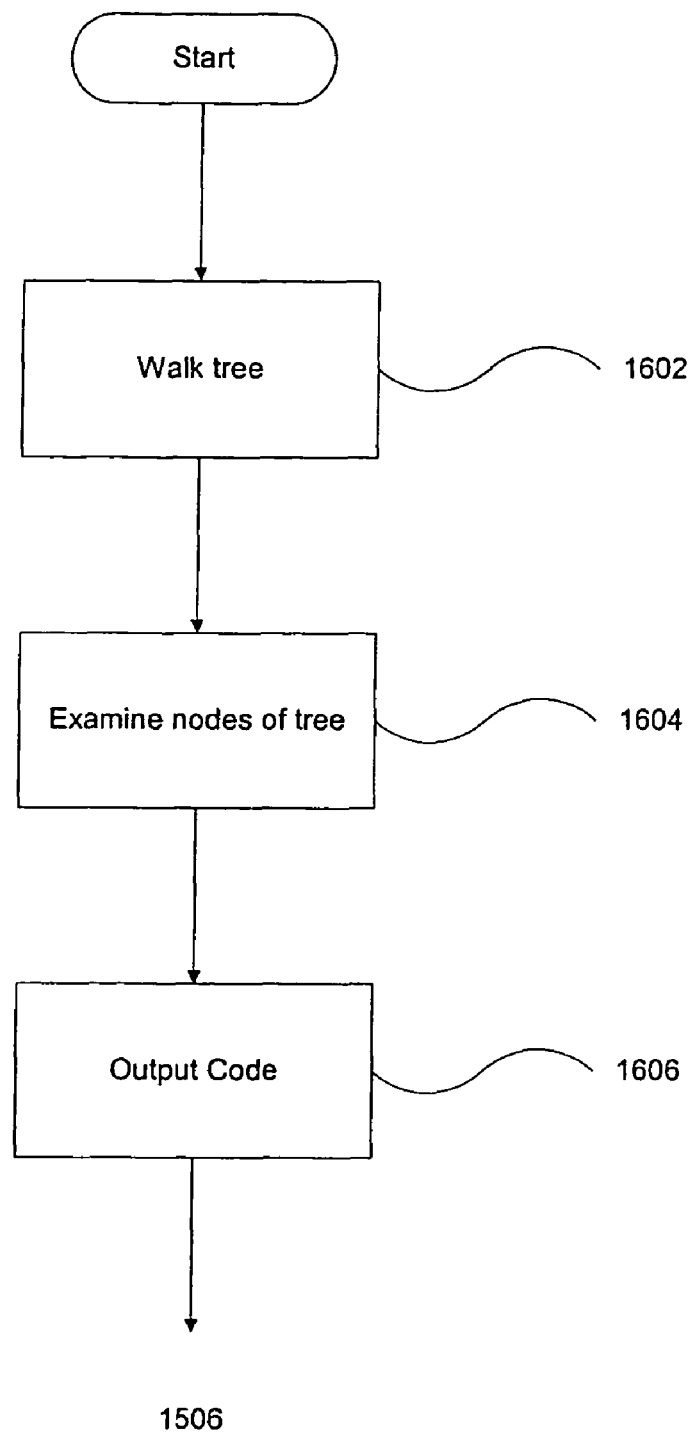
FIG. 10 is a flow diagram showing a process for generating the header section of a SQL statement for a search filter.

FIG. 10 depicts a flowchart of the process to output the header section of the SQL statement. The expression tree 1402 is walked (1602) and the nodes are examined (1604) to identify the tables that have to be accessed to perform the query. In an embodiment, the attribute_store and distinguished_names tables are always accessed. Thus, these two tables will always appear in the generated SQL statement. In the present example, the following header section is generated:

```
SELECT distinguished_name.EID, store.AttrName, store.AttrVal
   FROM attribute_store store, distinguished_name DN
   WHERE
```

Figure 11A:
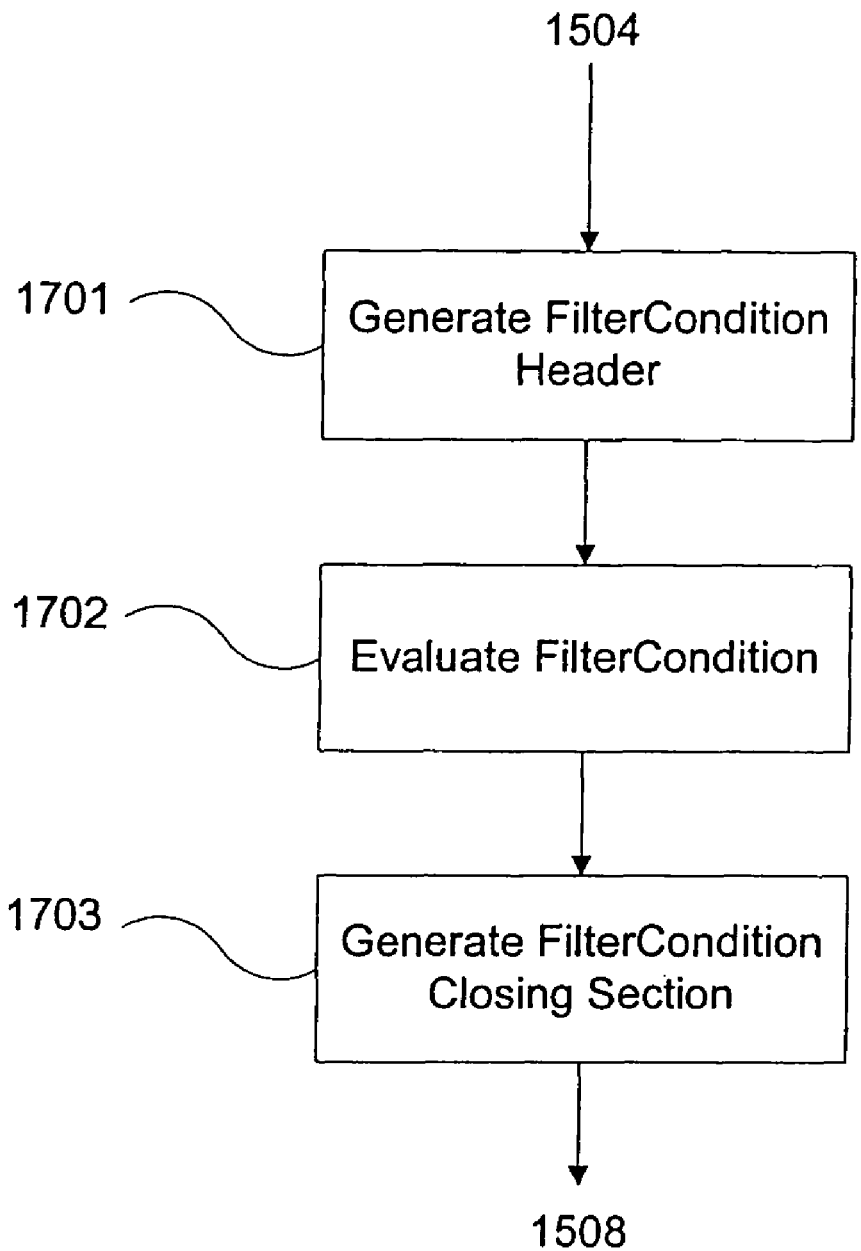
FIGS. 11A and 11B are flow diagrams showing a process for generating the body section of a SQL statement for a search filter.
Figure 11B:
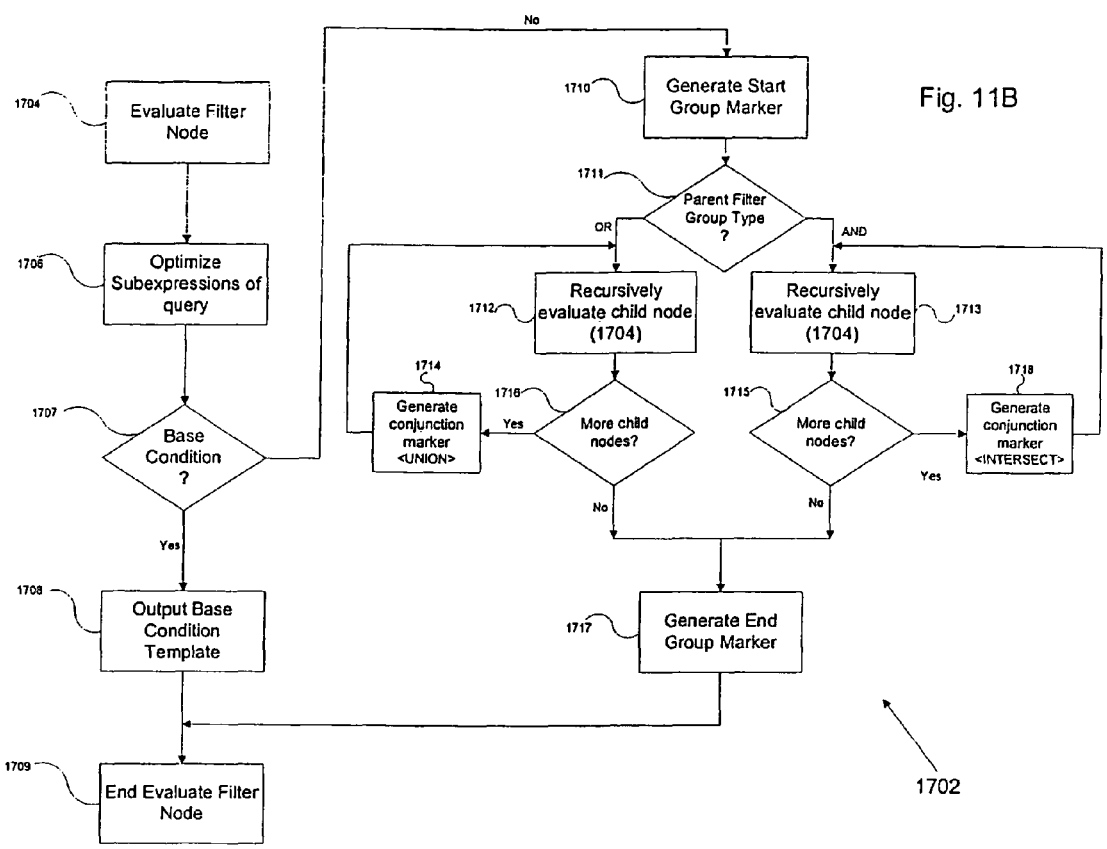

FIGS. 11A and 11B depict flow diagrams of the process to generate the body section of the SQL statement. The process examines the nodes of the expression tree 1402 and utilizes specialized templates to generate the SQL that performs the specific query operations that match the terms of the search filter.

Referring to FIG. 11A, the first action of the process is to generate the [FilterCondition header] section (1701), as described in more detail above. The filter node(s) of the expression tree 1402 are then evaluated to generate the appropriate SQL for the query (1702). In an embodiment, evaluating the filter nodes comprises the act of walking the nodes of expression tree 1402. Alternatively, the results of the tree walk from process action 1602 of FIG. 10 are stored in memory, and process action 1702 merely examines information about the nodes that are maintained in memory. Once the appropriate SQL has been generated, the [FilterCondition closing section] is generated (1703).

FIG. 11B depicts the process flow of a process 1702 for evaluating the filter node(s) of the expression tree and generating SQL corresponding to the filter conditions of the LDAP filter. Process 1702 is a recursive process, which can be recursively called from within itself to execute multiple times. Operation 1704 indicates the beginning of the process 1702 for evaluating a filter node, and operation 1709 indicates the end of the process 1702.

Optional optimizations may be performed to enhance the processing of the invention (1706). One optimization is to examine the LDAP filter to remove relatively simple/common boolean subexpressions from the filter. For example, the expression "!(!(a))" can be more simply represented as "(a)". Common/simple subexpression elimination is helpful in reducing the complexity of the resulting [FilterCondition] SQL statement, especially in the multiple NOT scenario. To facilitate the explanation of the invention, it is assumed that the present illustrative example does not have any search terms corresponding to this optimization, and thus process action 1706 will not be described in the below explanation.

At process action 1707, the filter node is evaluated to determine whether the node is part of a "base condition". According to a present embodiment, a base condition is a contiguous section of an expression tree that is expanded as large as possible while containing only zero or one of the following condition operators: "&" or "|". In an alternate embodiment, a base condition is a contiguous section of an expression that contains zero or more of the following condition operators: "Not", "Presence", "NotPresence", "&", or "|".

One aspect of an embodiment is directed to generating SQL for an LDAP query in which the generated SQL comprises a hybrid approach to aggregating/filtering data from multiple database tables. In particular, the generated SQL provides a balanced approach to using database "JOIN" operations with the use of other database aggregation/filtering operations, such as the "INTERSECT" and "UNION" operations. In many database systems, the JOIN operation provides a different level of efficiency than the INTERSECT or UNION operations, depending upon the particular situations in which these operations are utilized. Thus, the JOIN operation is more appropriately used on some circumstances, while the INTERSECT or UNION operations provides more efficiency in other circumstances.

When using a particular embodiment, the JOIN operation is used to aggregate data at lower levels of a query while the INTERSECT and UNION operations are used to aggregate data once the volume of data to aggregate has already been reduced by the JOIN operations. In the present embodiment, this is accomplished by using the JOIN operation to aggregate results within a base condition. The INTERSECT and UNION operations are used to aggregate the results between two base conditions, between two groups of base conditions, or between one base condition and another group of base conditions. Thus, setting the parameters of a "base condition" alters the mix between the use of JOIN operations and the use of other aggregation operations in the generated SQL.

Figure 8B:
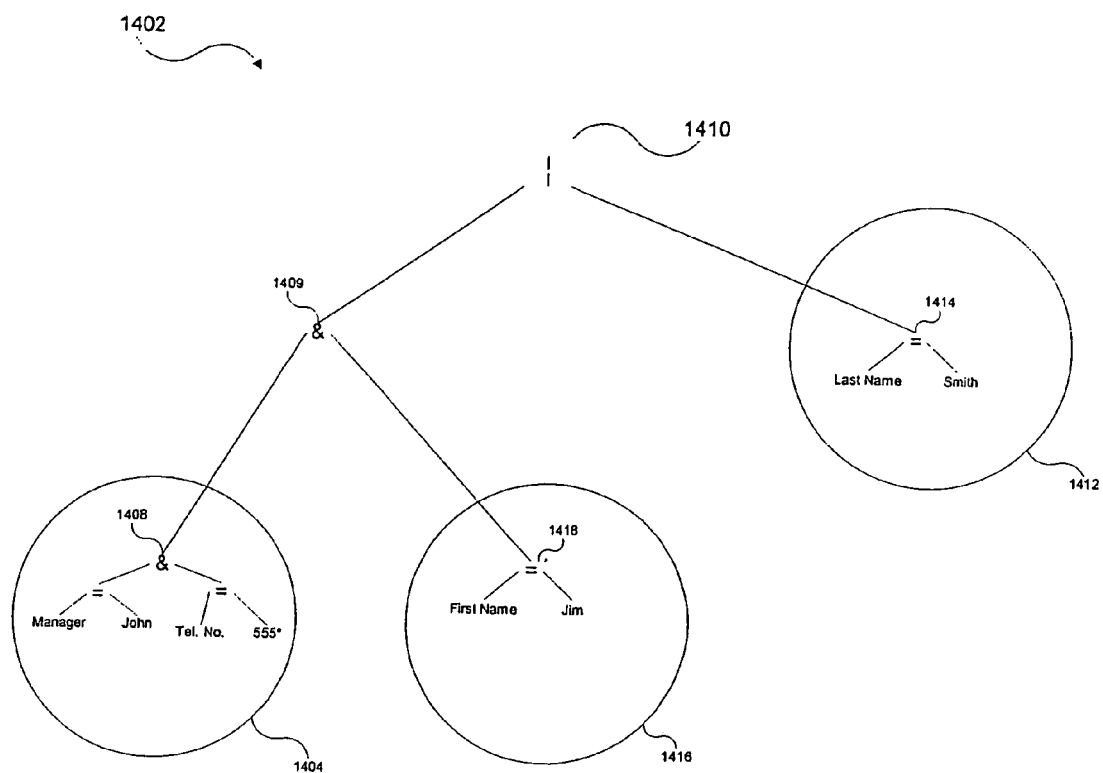
FIG. 8B illustrates the expression tree of FIG. 14A with base conditions circled.

FIG. 8B is a revised illustration of FIG. 8A showing circled areas that correspond to base conditions according to the presently preferred embodiment. Circled area 1404, which is a subtree section that is rooted at node 1408, comprises a base condition since this tree section has only one condition operator from the above-delineated list ("&" at node 1408). If this tree section is expanded by moving up one node, becoming a subtree rooted at node 1409, then this expanded subtree section cannot be a base condition since it contains two of the delineated condition operators (i.e., "&" at node 1408 and "&" at node 1409). This base condition cannot be contracted down any further since it would not therefore encompass the largest possible tree section with only zero or one of the listed condition operators. Thus, circled area 1404 is a base condition since it is a contiguous section of tree 1402 that has been expanded as wide as possible without containing more than one of the listed condition operators. A tree can have a plurality of base conditions. For example, circled area 1412, which is a subtree rooted at node 1414, is also a base condition since it has been expanded as large as possible without containing more than one of the delineated condition operators. Circled area 1416, which is a subtree rooted at node 1418, is another base condition.

The significance of a tree section being a base condition is that different templates are utilized in this process depending upon whether and what type of base condition is encountered. If the node under examination is part of a base condition, then the appropriate base condition template is output for that tree section rooted at that node. If a base condition is not found, this indicates that two or more base conditions exist beneath the node under examination. Each of the branches beneath the node under examination is considered a "subtree condition." Each subtree condition encompasses one or more base conditions. The subtree condition itself may have branches that are subtree conditions.

Referring back to FIG. 11B, the filter node is evaluated to determine whether it is part of a base condition (1707). In the present example, the first node under examination in tree 1402 is node 1410. Examination of node 1410 reveals that it is not part of a base condition, since the subtree section rooted at node 1410 has more than one node having either "&" or "|". Since node 1410 is not part of a base condition, it is recognized that there are two or more subtree sections beneath node 1410 that must be further evaluated by process 1702.

A "start group marker" is generated to indicate that the process will be recursively calling itself to generate SQL for the search conditions (1710). In an embodiment, the start group marker is an open parenthesis "(". At the end of the process, a corresponding "end group marker" will be generated for each "start group marker." In an embodiment, the "end group marker" is a closed parenthesis")".

The parent filter node type to the subtree conditions is examined to determine whether it is an "AND" or "OR" operator (1711). This determines whether the "INTERSECT" or "UNION" operation will be utilized by the generated SQL as the conjunction marker to aggregate the results of two subtree conditions. "UNION" is the SQL equivalent of the "|" condition operator. "INTERSECT" is the SQL equivalent of the "&"operation. In the present example, the parent filter node type (i.e., for node 1410) is a"|" operator, thus the UNION operation will be used as the conjunction marker between the two subtree conditions beneath node 1410.

At process action 1712, each of the subtree conditions is filled in by recursively going to a child node and restarting the filter node evaluation process 1702. Thus, the process will recursively return back to process action 1704 to evaluate the subtree section rooted at node 1414 (which is a child node of node 1410) to generate SQL for this subtree section. Once the evaluation of the subtree section rooted at node 1414 has completed, the process will return back to process action 1704 to evaluate the subtree section rooted at node 1409.

With respect to the subtree condition rooted at node 1414, node 1414 is evaluated (1704) by process 1702 to determine if it is part of a base condition (1707). The circled portion 1412 of tree 1402 corresponds to the subtree section that is examined during this process action. This subtree section is a base condition since there are zero condition operators of type "&" or "|" in the tree section. Thus, the appropriate base condition template is output for this base condition (1708).

Each type of base condition has a corresponding template that is utilized. For a base condition rooted with the "=" condition operator, the following template is employed in an embodiment of the invention:

```
SELECT EID FROM <CatalogTable>
   WHERE
      CatalogTable.AttrVal=value of search term
```

Specific catalog tables may be accessed to satisfy particular search parameters in the LDAP search filter. In the present example, the terms of the LDAP search filter contain the following attribute types: "Manager", "Tel. No.", "First Name", and "Last Name". Thus, the SQL query for this search filter will access catalog tables that correspond to these attribute types. For the purposes of this example, the catalog table for attribute type "Manager" will be referred to as "ct_manager," the catalog table for attribute type "Tel. No." will be called referred to as "ct_tel," the catalog table for the attribute type "Last Name" will be referred to as "ct_lastname," and the catalog table for the attribute type "First Name" will be referred to as "ct_firstname."

If the value of the search term contains a wildcard symbol, then the above template is changed to the following:

```
SELECT EID FROM <CatalogTable>
   WHERE
      CatalogTable.AttrVal like 'value of search term'
```

An embodiment of a template for a base condition rooted with an "&" is as follows:

```
SELECT at1.EID
   FROM CatalogTable1 at1, CatalogTable2 at2
   WHERE at1.EID=at2.EID
      And at1.AttrVal like 'SEARCHVALUE1'
      And at2.AttrVal like 'SEARCHVALUE2'
```

An embodiment of a template for a base condition rooted with a "|" is as follows:

```
SELECT at1.EID
   FROM CatalogTable1 at1
   WHERE at1.AttrVal like 'SEARCHVALUE1'
UNION
SELECT at2.EID
   FROM CatalogTable2 at2
   WHERE at2.AttrVal like 'SEARCHVALUE2'
```

An embodiment of a template for a base condition for a "not" condition is as follows:

```
SELECT DN.EID
   FROM distinguished_names DN, <CatalogTable> at1
   WHERE at1.AttrVal (+) like 'Value of search term'
   AND DN.EID=at1.EID (+)
   AND at1.EID is NULL
```

An embodiment of a template for a base condition for a "presence" condition is as follows:

```
SELECT at1.EID
   FROM <CatalogTable> at1
```

An embodiment of a template for a base condition for a "NotPresence" condition is as follows:

```
SELECT DN.EID
   FROM distinguished-names DN, <CatalogTable> at1
   WHERE DN.EID=at1.EID (+)
   AND at1.EID is NULL
```

Once the base condition template has been generated, the process to evaluate a filter condition ends (1709), and the process 1702 returns back to the calling process action 1712. Thus, after node 1414 has been evaluated, the SQL that has been generated to this point is as follows:

```
SELECT distinguished_name.EID,              /*header section */
   store.AttrName, store.AttrVal
   FROM attribute_store store, distinguished_name DN
   WHERE
      DN.EID IN (       /* FilterCondition header */
      ( /* "start group marker" */
         SELECT EID FROM ct_lastname at3    /* template for subtree */
            WHERE at3.AttrVal = 'Jim'       /* rooted at node 1414 */
```

A determination is then made whether there are any other child nodes to examine (1716). If so, then the appropriate conjunction marker is generated and added to the previously generated SQL (1714). In the present example, the other child node 1409 still has to be examined, thus the previously identified conjunction marker "UNION" is output and added to the previously generated SQL as follows:

```
SELECT distinguished_name.EID,           /*header section */
    store.AttrName, store.AttrVal
    FROM attribute_store store, distinguished_name DN
    WHERE
    DN.EID IN (         /* FilterCondition header */
    ( /* "start group marker" */
        SELECT EID FROM ct_lastname at3    /* template for subtree */
            WHERE at3.AttrVal = 'Jim'      /* rooted at node 1414 */
        UNION               /* conjunction marker */
```

The process then returns to process action 1712 to recursively evaluate the other child node 1409. With regard to the subtree condition rooted at node 1409, node 1409 is evaluated (1704) to determine if it is the root node for a base condition (1707). Since the subtree rooted at node 1409 contains more than one of the condition operators "&" or "|", this subtree section is not a base condition. Therefore, this indicates that there are multiple subtree conditions beneath node 1409 that must be further evaluated. The process proceeds to generate another "start group marker" (1710):

```
SELECT distinguished_name.EID,           /*header section */
    store.AttrName, store.AttrVal
    FROM attribute_store store, distinguished_name DN
    WHERE
    DN.EID IN (         /* FilterCondition header */
    ( /* "start group marker" */
        SELECT EID FROM ct_lastname at3    /* template for subtree */
            WHERE at3.AttrVal = 'Jim'      /* rooted at node 1414 */
        UNION               /* conjunction marker */
        ( /* "start group marker" */
```

Node 1409 has two child nodes that must be evaluated further. A child node 1418 roots a first subtree section beneath node 1409. A second child node 1408 roots a second subtree section beneath node 1409. The parent filter node type to these two subtree sections is a "&" operator, thus the conjunction marker for this subtree group is "INTERSECT" (1711).

Since the parent filter node type is an "AND", the process proceeds to process action 1713 to recursively evaluate the filter nodes for each subtree condition. With respect to the subtree rooted at node 1418, node 1418 is evaluated (1704) to determine if it is the root node for a base condition (1707). The circled portion 1416 of tree 1402 corresponds to the subtree area that is examined during this particular process action. This subtree area is a base condition since there are no condition operators of type "&" or "|" in this tree section. As such, process action 1708 is executed to output the appropriate base condition template, which is added the previously generated SQL. Once the base condition template has been generated, the process to evaluate a filter node ends (1709), and the process returns back to the calling process action 1713. At this point, the generated SQL for this example is as follows:

```
SELECT distinguished_name.EID,           /*header section */
    store.AttrName, store.AttrVal
    FROM attribute_store store, distinguished_name DN
    WHERE
    DN.EID IN (         /* FilterCondition header */
    ( /* "start group marker" */
        SELECT EID FROM ct_lastname at3    /* template for subtree */
            WHERE at3.AttrVal = 'Jim'      /* rooted at node 1414 */
        UNION               /* conjunction marker */
        ( /* "start group marker" */
            SELECT EID FROM ct_firstname at2   /* template for subtree */
                WHERE at2.AttrVal = 'Jim'      /* rooted at node 1418 */
```

An evaluation is then made as to whether there are any other child nodes of parent node 1409 to examine (1715). In the present example, the subtree rooted at node 1408 still needs to be examined. Thus, the appropriate conjunction marker is generated (1718), and the process proceeds back to process action 1713 to recursively evaluate filter node 1408. The subtree rooted at node 1408 is evaluated (1704) to determine if it is the root node for a base condition (1707). The circled portion 1404 of tree 1402 corresponds to the subtree area that is examined during this process action. This subtree area is a base condition since there is only one condition operator of type "&" or "|" in this tree section. As such, process action 1708 is executed to generate the appropriate template for this base condition:

```
SELECT distinguished_name.EID,           /*header section */
    store.AttrName, store.AttrVal
    FROM attribute_store store, distinguished_name DN
    WHERE
    DN.EID IN (         /* FilterCondition header */
    ( /* "start group marker" */
        SELECT EID FROM ct_lastname at1    /* template for subtree */
            WHERE at1.AttrVal = 'Smith'    /* rooted at node 1414 */
        UNION               /* conjunction marker */
        ( /* "start group marker" */
            SELECT EID FROM ct_firstname at2   /* template for subtree */
                WHERE at2.AttrVal = 'Jim'      /* rooted at node 1418 */
            INTERSECT           /* conjunction marker */
            SELECT EID FROM ct_manager at3,    /* template for      */
            ct_tel at4                         /* subtree rooted    */
                WHERE at3.AttrVal like 'John%' /* at node 1408      */
                AND at4.AttrVal like '555%'
                AND at3.EID=at4.EID
```

The process then returns back to process action 1713. Since there are no more child nodes to examine, an "end group marker" is generated to correspond to each previously generated "start group marker" (1717). The [FilterCondition closing section] is then generated to complete the body section of the SQL statement (1703 from FIG. 11A). At this point, the generated SQL statement is as follows:

```
SELECT distinguished_name.EID,           /*header section */
    store.AttrName, store.AttrVal
    FROM attribute_store store, distinguished_name DN
    WHERE
    DN.EID IN (         /* FilterCondition header */
    ( /* start group marker */
```

```
    SELECT EID FROM ct_lastname at1      /* template for subtree */
        WHERE at1.AttrVal = 'Smith'       /* rooted at node 1414 */
    UNION                   /* conjunction marker */
    ( /* start group marker */
        SELECT EID FROM ct_firstname at2      /* template for subtree */
            WHERE at2.AttrVal = 'Jim'          /* rooted at node 1418 */
        INTERSECT      /* conjunction marker */
        SELECT EID FROM ct_manager at3, ct_tel at4   /* template for    */
        WHERE at3.AttrVal like 'John%'               /* subtree rooted */
        AND at4.AttrVal like '555%'                  /* at node 1408   */
        AND at3.EID=at4.EID
    )   /* end group marker */
  )    /* end group marker */
)       /* FilterCondition closing section */
```

Figure 12:
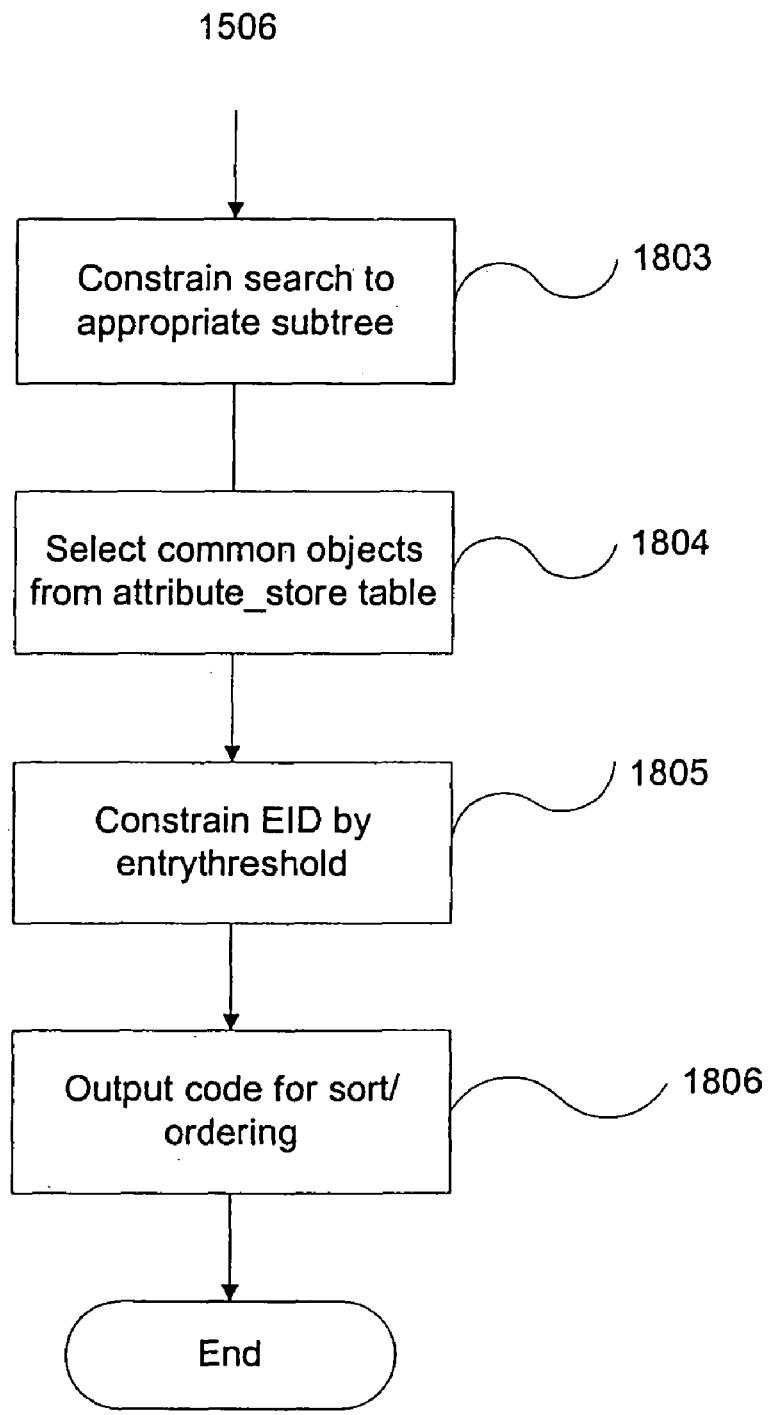
FIG. 12 is a flow diagram showing a process for generating the closing section of a SQL statement for a search filter.

FIG. 12 is a flowchart showing more details of the process to generate the closing section of the base template. The first action is to generate SQL to constrain the subtree search to the appropriate tree of entries (1803). The next action is to output SQL to select the entries from the attribute_store table that match the EIDs from the distinguished names table (1804). The next action is to output SQL to constrain the list of EID numbers to those at or above the entryThreshold variable (1805). The final action is to output SQL for sorting/ordering the results (1806).

In an embodiment, the template for the closing section of the SQL query is as follows:

```
            AND [DNCondition]
            AND store.EID = DN.EID
            AND DN.EID >= :entryThreshold
            ORDER BY store.EID
```

Filling in this template with the appropriate information from the example produces the following closing section:

```
    AND (DN.parentDN like :bDN OR (DN.rDN like :rDN
    AND DN.parent DN like :pDN))
    AND DN.EID=Store.EID
    AND DN.EID >= :entryThreshold
    ORDER BY store.EID
```

The bind variables are replaced with the appropriate distinguished names values prior to execution. Thus, the generated SQL for this example, including the header, body, and closing sections is as follows:

```
SELECT distinguished_name.EID,        /*header section */
    store.AttrName, store.AttrVal
    FROM attribute_store store, distinguished_name DN
    WHERE
    DN.EID IN (      /* FilterCondition header */
    ( /* start group marker */
        SELECT EID FROM ct_lastname at1      /* template for subtree */
            WHERE at1.AttrVal = 'Smith'       /* rooted at node 1414 */
        UNION                   /* conjunction marker */
        ( /* start group marker */
            SELECT EID FROM ct_firstname at2      /* template for subtree */
                WHERE at2.AttrVal = 'Jim'          /* rooted at node 1418 */
            INTERSECT          /* conjunction marker */
            SELECT EID FROM ct_manager at3,      /* template for     */
            ct_tel at4                            /* subtree rooted  */
            WHERE at3.AttrVal like 'John%'        /* at node 1408    */
            AND at4.AttrVal like '555%'
            AND at3.EID=at4.EID
        )   /* end group marker */
      )    /* end group marker */
    )       /* FilterCondition closing section */
    AND (DN.parentDN like :bDN            /* closing section */
    OR (DN.rDN like :rDN
        AND DN.parent DN like :pDN))
    AND DN.EID=Store.EID
    AND DN.EID >= :entryThreshold
ORDER BY store.EID
```

In an alternate embodiment, a shortened process is followed if the very first node under examination is part of a base condition. If this occurs, then additional select statements are not placed into the body section of the template. Instead, the body section merely contains a "WHERE" clause that sets forth the conditions that are searched for. The select statement in the header section controls the operation of the "WHERE" clause.

An additional optimization to the invention recognizes that certain filter types do not substantively result in any actual filtering. For example, the term (objectclass=*) refers to all entries. The generated SQL for this element can therefore directly use the distinguished name table (i.e., by not accessing the attribute catalog tables) to filter entries belonging to the appropriate tree for the base of the search.

The foregoing process for generating SQL is a mechanical process that applies to any LDAP search filter of arbitrary complexity. Other types of queries, whether LDAP compliant or not, can also be similarly processed to generate SQL. To accomplish this, the appropriate templates are fabricated to handle possible conditions and condition operators in the search term. The present invention is not limited to queries, but is equally applicable to other kinds of database operations. Thus, the foregoing process can be utilized to generate a SQL statement to modify, add, or delete LDAP information objects from a database.

Additional information about an approach for generating a query is disclosed in co-pending U.S. application Ser. No. 09/207,160, filed on Dec. 7, 1998, Atty. Dkt. No. 235/257, entitled "SYSTEM AND METHOD FOR GENERATING A DATABASE QUERY LANGUAGE STATEMENT" which is hereby incorporated by reference in its entirety.

Querying Implicit Hierarchy

The present invention allows clients to issue a hierarchical query against an implicit hierarchy. In an embodiment, an extension is made to the standard LDAP search operation of the LDAP Protocol so that a client can specify the hierarchical query criteria, e.g., directed to an attribute to be used to connect to two nodes, the starting value, walk down or up in the hierarchy. When an LDAP server receives such an extended request, it uses the present mechanism to query on the hierarchical data. With this approach, clients will issue only a single query and yet be able to read information about all the nodes in the implicit hierarchy. The storage architecture presented above is utilized in one embodiment to facilitate the process for querying an implicit hierarchy.

Figure 1A:
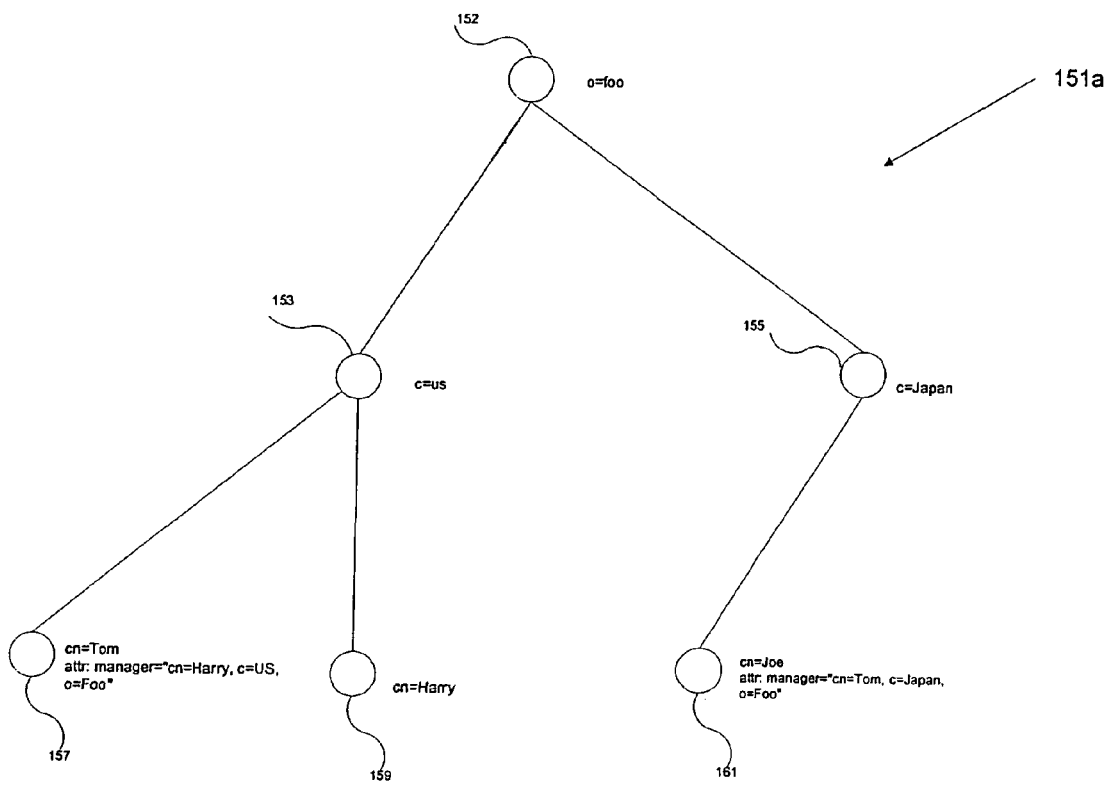
FIG. 1A illustrates an example of a directory information tree.
Figure 1B:
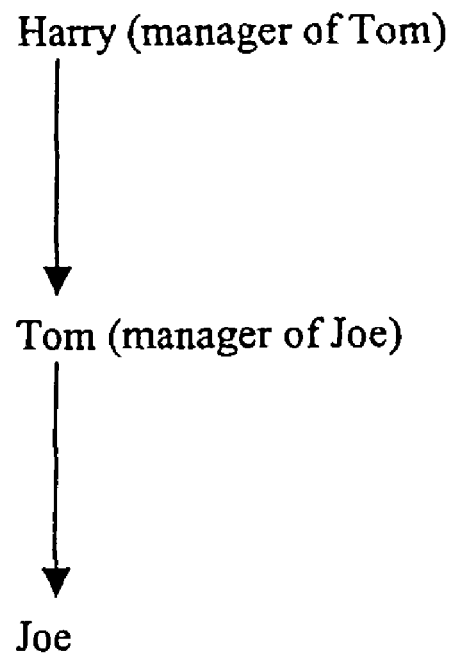
FIG. 1B shows an implicit hierarchy within the DIT of FIG. 1A.
Figure 2A:
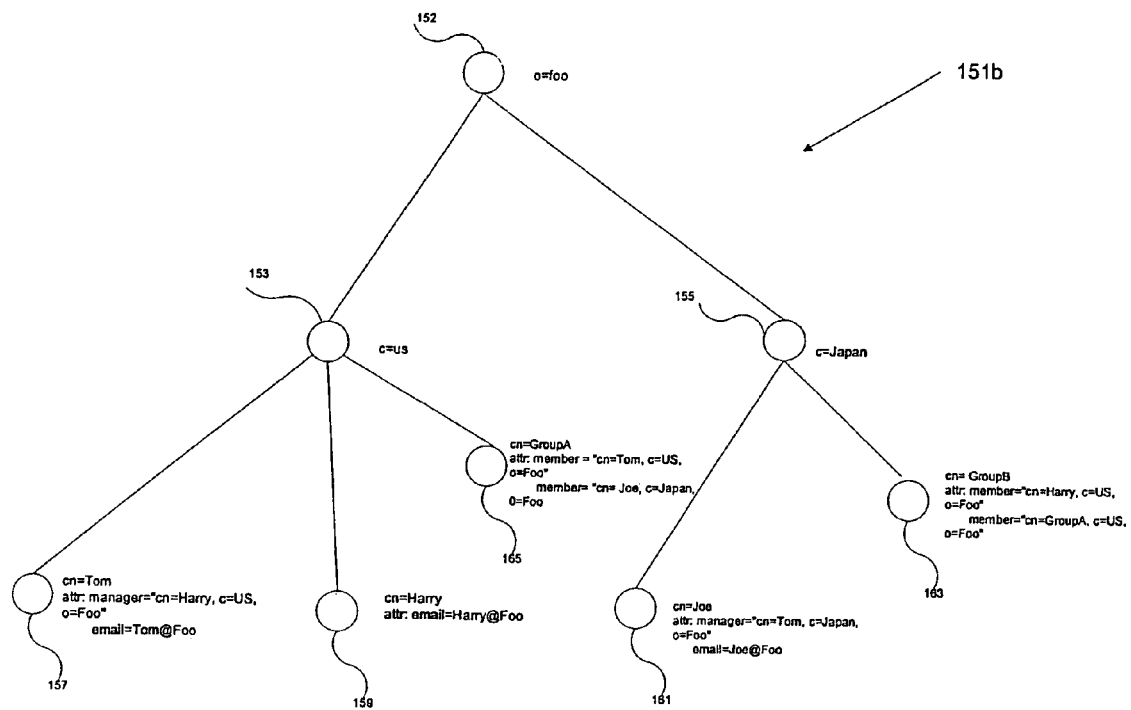
FIG. 2A illustrates another example of a directory information tree.
Figure 2B:
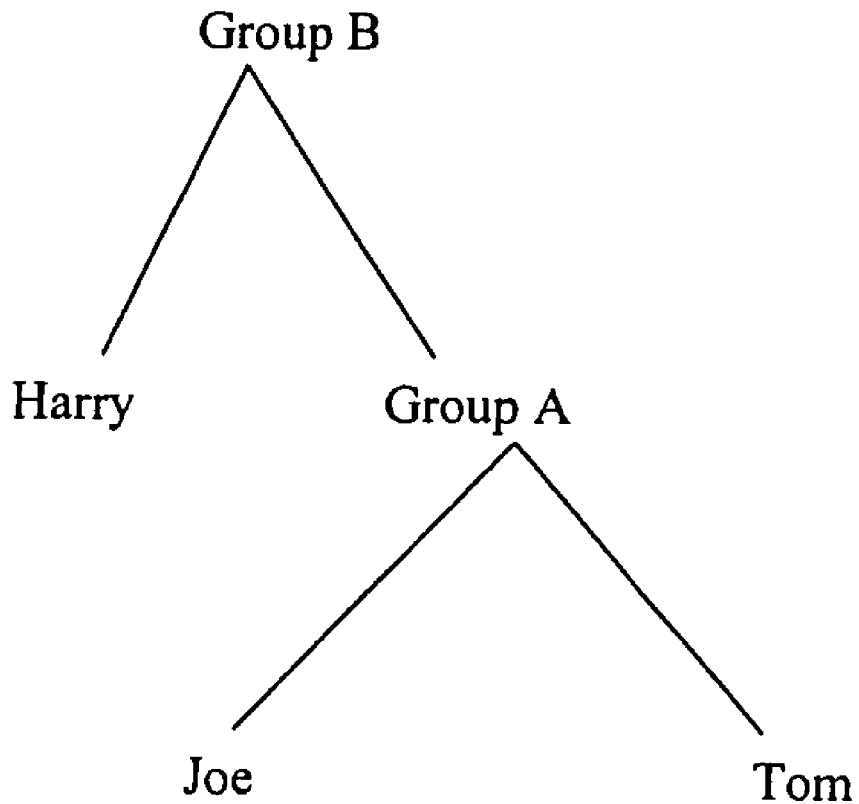
FIG. 2B shows an implicit hierarchy within the DIT of FIG. 2A.

To illustrate, consider again the DIT 151a and 151b of FIGS. 1A and 2A. Recall that these DITs are organized on a geographical basis, in which users are placed as child entries beneath either entry 153 (c=US) if they are located in the U.S. or are placed as child entries beneath entry 155 (c=Japan) if they are located in Japan. Therefore, the explicit hierarchy shown in these DITs are geographically based. FIG. 1B shows an implicit organizational hierarchy based upon the "manager" attribute for users represented in DIT 151a. FIG. 2B shows an implicit group hierarchy for mail group membership in DIT 151b.

FIG. 13 shows an example attribute store table 1931 for the contents of DIT 151b. The entry identifier (EID) value for each entry in DIT 151b is stored in the EID column of table 1931. Therefore, rows 1930, 1932, and 1934 correspond to attributes of entry 157. Row 1930 corresponds to the DN value for entry 157 in DIT 151b, indicating that the DN value for this entry is "cn=Tom, c=US, o=Foo". Row 1932 corresponds to the "manager" attribute for entry 157, and indicates that the manager for this user is "Harry". Row 1934 corresponds to the email attribute for entry 157, and indicates that the email address for this user is "Tom@Foo". Rows 1937 and 1938 correspond to attributes of entry 159 of DIT 151b. Row 1936 corresponds to the DN value, indicating that the DN value for this entry is "cn=Harry, c=US, o=Foo". Row 1938 corresponds to the email attribute for entry 159, and indicates that the email address for this user is "Harry@Foo". Similarly, rows 1940, 1942, and 1944 correspond to attributes of entry 161. Row 1940 corresponds to the DN value for entry 161 in DIT 151b, indicating that the DN value for this entry is "cn=Joe, c=Japan, o=Foo". Row 1942 corresponds to the "manager" attribute for entry 161, and indicates that the manager for this user is "Tom". Row 1944 corresponds to the email attribute for entry 161, and indicates that the email address for this user is "Joe@Foo".

Row 1946 corresponds to the DN attribute for the Group B entry 163 of DIT 151b. Rows 1950 and 1952 identify the members of this Group. Specifically, row 1950 identifies Group A as being a member of Group B and row 1952 identifies Harry as being a member of this same mail group.

Row 1948 corresponds to the DN attribute for the Group A entry 165 of DIT 151b. Rows 1954 and 1956 identify the members of this Group. Specifically, row 1954 identifies Tom as being a member of Group A and row 1956 identifies Joe as being a member of this same mail group.

FIGS. 14A-14D present example catalog tables corresponding to the attribute store table 1931. As noted above, each row of a catalog table is directed to a different entry that contains the cataloged attribute type. Each row identifies the EID of the entry of object comprising that attribute type, and the attribute value for that EID. If a new object is added to the system having an attribute of a cataloged type, then a new entry is added to the respective catalog table. If an existing object having a cataloged attribute type is deleted or the attribute value for that object is deleted, then the corresponding entry in the respective catalog table is also deleted. In an embodiment, the catalog table is maintained in a sorted list of entries. In another embodiment, the catalog table is not sorted. Instead, one or more indexes, e.g., a bitmap and/or b*tree index, are maintained for the catalog tables. Catalog tables may store the attribute value information in a normalized and/or canonical format. In one embodiment, the canonical formats to be used are based upon matching rules established for each attribute type. Matching rules are descriptions of rules that are used to perform a query, search, sort, or comparison of attribute values. The definition of each attribute type specifies which matching rule should be used to compare its attribute values. One matching rule is specified for each type of matching (e.g., equality, substring, ordering, or approximate match) if that matching is allowed for the attribute type. The type of matching types allowed may depend on the syntax of the attribute type (e.g. ordering match may not be allowed on attribute types of syntax 'binary'). A matching rule may be used by multiple attribute types and multiple attribute syntaxes.

FIG. 14A depicts a catalog table that indexes the attribute type "email." Each entry having an attribute of type "email" is cataloged in the table of FIG. 14A. Row 2002 identifies entry 157 as having the email address "tom@foo". Row 2004 identifies entry 159 as having the email address "harry@foo". Row 2006 identifies entry 161 as having the email address "joe@foo".

Similarly, FIG. 14B depicts a catalog table for the attribute type "Manager". Each entry having an attribute of type "manager" is cataloged in the table of FIG. 14B. Row 2008 identifies entry 157 as having the manager with the DN: "cn=harry, c=us, o=foo". Row 2010 identifies entry 161 as having the manager with the DN: "cn=joe, c=japan, o=foo".

FIG. 14C depicts a catalog table that indexes the normalized DN values for each entry in the DIT. Therefore, the normalized DN value for user "Tom" is stored in row 2014. The normalized DN value for user "Harry" is stored in row 2016. The normalized DN value for user "Joe" is stored in row 2018. The normalized DN value for Group B is stored in row 2017. The normalized DN value for Group is stored in row 2019.

FIG. 14D shows a catalog table that indexes the members of each Group in DIT 151d. Rows 2020 and 2022 identifies the members of Group B (entry 163) as having the DNs: "cn=GroupA, c=US, o=Foo" and "cn=Harry, c=US, o=Foo", respectively. Rows 2024 and 2026 identifies the members of Group A (entry 165) as having the DNs: "cn=Joe, c=Japan, o=Foo" and "cn=Tom, c=US, o=Foo", respectively.

According to one embodiment of the invention, implicit hierarchies can be queried by accessing the relevant catalog tables for the attribute relevant to the query. Each identified entry in the relevant catalog table is followed through its implied hierarchical chains until all relevant entries have been identified. The catalog table containing the normalized form of the DN for each user can be consulted to identify the entry identifier for each entry corresponding to implicit hierarchy being queried, which can be searched in the appropriate catalog table to search the chain of entries for the implied hierarchy. Different types of information can be returned depending upon the search criteria. For example, the list of names in the implicit hierarchy can be returned. Alternatively, the identified entry ID can be used to return a desired attribute for the implicit hierarchy, by accessing the appropriate catalog table for the found entries.

Different kinds of queries can be posed against an implicit hierarchy, e.g., based upon the direction of search within the hierarchy. For example, a "top-down" query starts at a higher point in a hierarchy tree and searches downward through the implicit hierarchy for matching entries. With reference to the organization structure of FIG. 1B, an example of this type of query is a search for all direct or indirect reports for the Manager named Harry. This query starts at a higher point in the hierarchy (i.e., at the "Harry" entry) and searches downward through the hierarchy. Another type of query that can be posed is in the "bottom-up" direction, which starts at a lower point and searches upwards through the implied hierarchical tree. With reference to the organization structure of FIG. 1B, an example of this type of query is a search for all direct or indirect managers for the user named Joe. This query starts at a lower point in the hierarchy (i.e., at the "Joe" entry) and searches upward through the hierarchy.

Figure 15A:
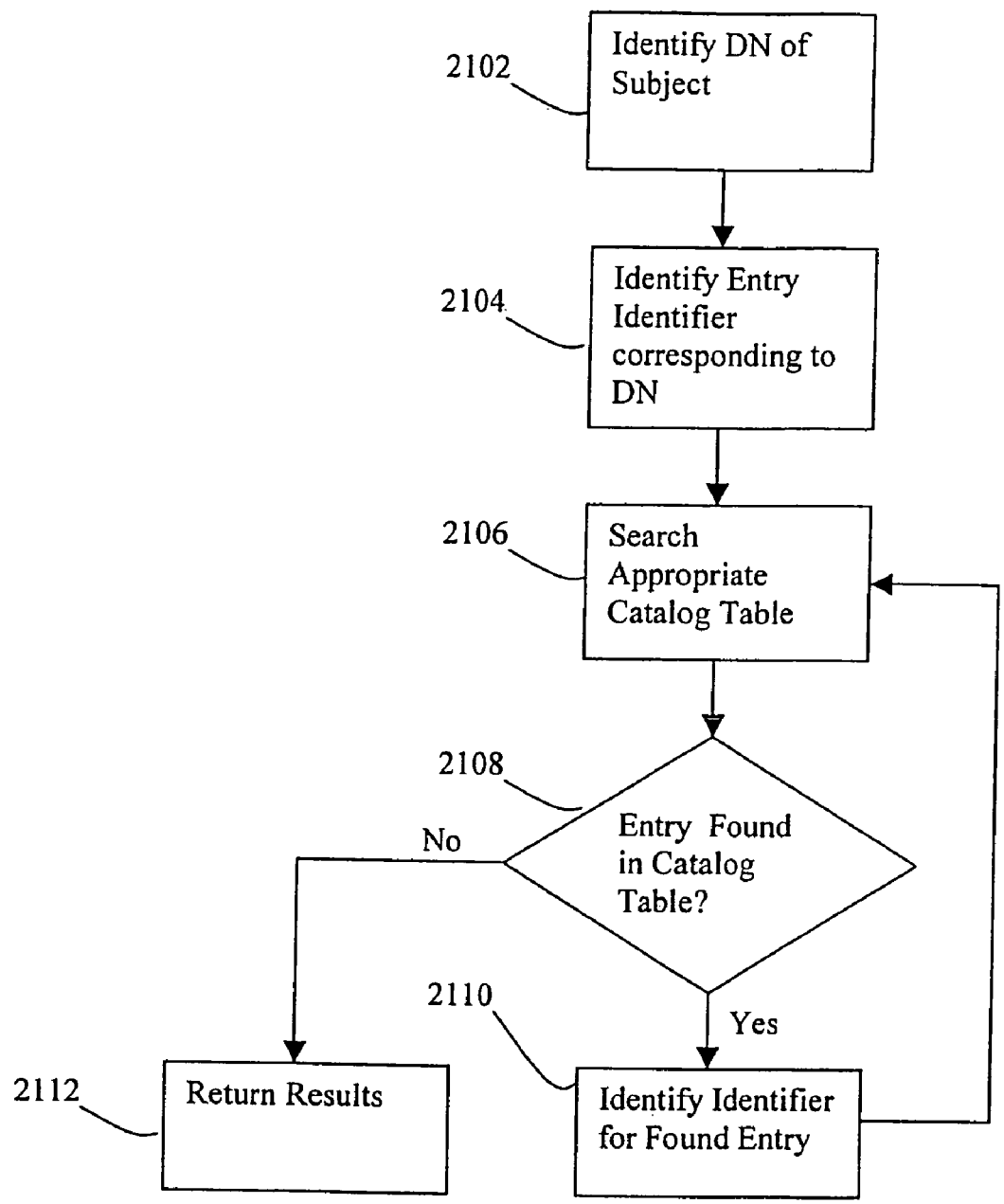
FIGS. 15A and 15B are flow diagrams showing processes for querying an implicit hierarchy according to an embodiment of the invention.

FIG. 15A shows a flowchart of a process for performing a bottom-up query against an implicit hierarchy. At 2102, the DN of the subject is identified, and at 2104, the relevant EID value corresponding to the DN is also identified. This can be accomplished by searching the Normalized DN Catalog Table for the row corresponding to the DN value, and extracting the EID value from the EID column. Next, the appropriate catalog table(s) are searched for the EID of interest (2106). A determination is made whether an entry corresponding to the EID value is found in the catalog table (2108). If so, then that entry provides a found result for the query. This result may be a DN of the matching entry in the catalog table. The EID for that result is then identified (2110).

In an embodiment, queries having different scopes can be placed against an implicit hierarchy. A single level search will only search against one level of relationship in the hierarchy. A multi-level search will search against multiple levels of relationships in the hierarchy. Therefore, in an embodiment, the query can be placed to search against any specified n levels of the implicit hierarchy. Alternatively, the process can be configured such that it defaults to a search of all applicable levels of the implied hierarchy. If the desired query is a single-level search, then the process ends after the direct result(s) have been found (i.e., those results that are directly found based upon the initial EID value). For a multi-level search of indirect relationships in the implicit hierarchy, the process returns back to 2106 to determine whether there are any indirect results that match the found EID value. For a multi-level query, the process can cycle through until all direct and indirect results have been obtained.

At 2112, the results are returned to the originator of the query. If attribute information is desired, then the found EID or DN value(s) can be used to access the appropriate catalog table or the attribute store table for the desired attribute information.

Consider if it is desired to query in the bottom-up direction against the indirect hierarchy shown in FIG. 1B. For example, consider if it is desired to identify all the direct and indirect managers for user "Joe". Here, this can be accomplished by querying against the Manager Catalog Table of FIG. 14B and the Normalized DN Catalog Table of FIG. 14C. The Normalized DN Catalog Table is accessed to identify the EID of the subject for this query. Since the subject is Joe, the relevant row 2018 in the Normalized DN Catalog Table is the following:

| EID | AttrValue |
|---|---|
| 161 | cn=joe, c=japan, o=foo |

This row 2018 identifies the EID for user "Joe" as having the value "161". This EID value is used to access the relevant row(s) in the Manager Catalog Table to identify the manager for user Joe. Here, the relevant row 2010 for this EID value in the Manager Catalog Table is the following:

| EID | AttrValue |
|---|---|
| 161 | cn=tom, c=us, o=foo |

This row 2010 identifies the DN for the direct manager for user Joe, which is "cn=tom, c=us, o=foo".

The next step is to identify the indirect manager(s) for user Joe. Using the identified DN value for the direct manager, the EID value is identified for the direct manager "Tom". This EID value can be found from accessing the Norm DN Catalog Table of FIG. 14C. Here, the relevant row 2014 for this DN value from the Norm DN Catalog Table is:

| EID | AttrValue |
|---|---|
| 157 | cn=tom, c=us, o=foo |

This row 2014 identifies the EID for Joe's direct manager "Tom" as having the value "157". This EID value is used to access the relevant row(s) in the Manager Catalog Table to identify the manager for Tom (which is the indirect manager, once-removed, for Joe). Here, the relevant row 2008 for this EID value in the Manager Catalog Table is the following:

| EID | AttrValue |
|---|---|
| 157 | cn=harry, c=us, o=foo |

This row 2008 identifies the DN for the indirect manager for user Joe (i.e., the direct manager for Tom), which is "cn=harry, c=us, o=foo".

The process is repeated until all of the direct and indirect managers have been identified.

If attributes for the identified entry results are desired, then the desired attribute can be found using the identified EID values to access the appropriate attribute information from the attribute store table. If only the DN is known, then the Norm DN Catalog Table can be accessed to identify the EID value. Alternatively, the appropriate catalog table for the attribute of interest can be accessed to identify the desired attribute information. For example, for each of the identified managers for user Joe, consider if it is desired to obtain their email addresses. As each direct or indirect manager is identified, the EID value for that manager can be used to identify their email address by accessing the relevant row for that EID in the attribute store table of FIG. 13.

Figure 15B:
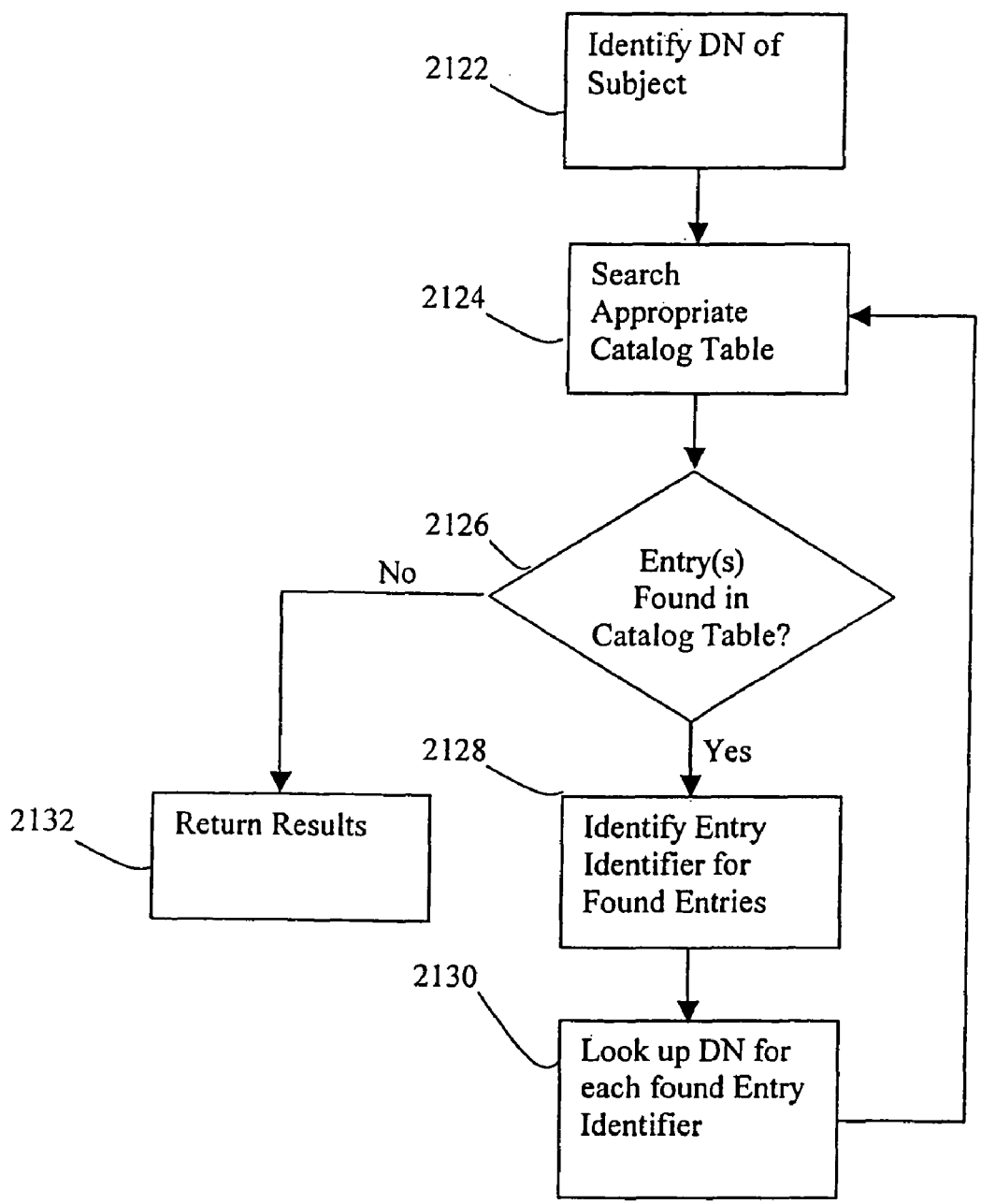

FIG. 15B shows a flowchart of a process for performing a top-down query against an implicit hierarchy. At 2122, the DN of the subject is identified. At 2124, the appropriate catalog table for the attribute of interest is searched for any entries corresponding to the DN of the subject. A determination is made whether one or more entries corresponding to the DN value is found in the catalog table (2126). If so, then the EID (entry identifier) of the matching entry(s) in the catalog table are identified (2128). The DN values for these EID values are identified (2130). The DN corresponding to these EID values can be determined by performing a look-up in the Normalized DN catalog table. This provides the direct results for an one level search through the implicit hierarchy.

If the desired query is a single-level search, then the process ends after the direct result(s) have been found (i.e., those results that are directly found based upon the initial DN value). For a multi-level search of indirect relationships in the implicit hierarchy, the process returns back to 2124 to determine whether there are any indirect results that match the found DN value(s). For a multi-level query, the process can cycle through until all direct and indirect results have been obtained.

At 2132, the results are returned to the originator of the query. If attribute information is desired, then the found EID or DN value(s) can be used to access the appropriate catalog table or the attribute store table for the desired attribute information. Consider if it is desired to query in the top-down direction against the indirect hierarchy shown in FIG. 1B. For example, consider if it is desired to identify all the direct and indirect reports for the manager named "Harry". Here, this can be accomplished by querying against the Manager Catalog Table of FIG. 14B and the Normalized DN Catalog Table of FIG. 14c.

The normalized form of the DN for Harry is obtained. This can be accomplished by using the appropriate matching rules (e.g., those rules used to form the entries of the Norm DN Catalog Table) to generate the normalized form of the DN for Harry. For this example, the normalized form of the DN for Harry is "cn=harry, c=us, o=foo".

This normalized DN value is used to identify the relevant row(s) in the Manager Catalog Table of FIG. 14B to specify users that have Harry as their manager. Here, the row 2008 that has this DN value in the "AttrValue" column of the Manager Catalog Table is the following:

| EID | AttrValue |
|---|---|
| 157 | cn=harry, c=us, o=foo |

This row 2008 identifies the EID value of the user that is the direct report to manager Harry, which means this direct report has the EID value 157.

The next step is to identify the user that corresponds to this EID value. Using the identified EID value for the direct manager, the DN for this user is identified by accessing the Norm DN Catalog Table of FIG. 14C (or the Attribute Store Table of FIG. 13). Here, the relevant row 2014 for this DN value from the Norm DN Catalog Table is:

| EID | AttrValue |
|---|---|
| 157 | cn=tom, c=us, o=foo |

This row 2014 identifies the DN of the user that directly reports to manager "Harry" as "cn=tom, c=us, o=foo". Therefore, user "Tom" is a direct report to manager Harry.

To identify any direct reports for Tom, and thereby identify indirect reports for Tom's manager Harry, this process is repeated using the DN for user Tom. The normalized DN value for Tom is used to identify the relevant row(s) in the Manager Catalog Table of FIG. 14B to specify users that have Tom as their manager. Here, the row 2010 that has this DN value in the "AttrValue" column of the Manager Catalog Table is the following:

| EID | AttrValue |
|---|---|
| 161 | cn=tom, c=us, o=foo |

This row 2010 identifies the EID value of the user that is the direct report to manager Tom, which means this direct report has the EID value 161.

The next step is to identify the user that corresponds to this EID value. Using the identified EID value for the direct manager, the DN for this user is identified by accessing the Norm DN Catalog Table of FIG. 14C (or the Attribute Store Table of FIG. 13). Here, the relevant row 2018 for this DN value from the Norm DN Catalog Table is:

| EID | AttrValue |
|---|---|
| 161 | cn=joe, c=japan, o=foo |

This row 2014 identifies the DN of the user that directly reports to manager "Tom" as "cn=joe, c=japan, o=foo". Thus, user "Joe" directly reports to manager Tom, and is therefore also an indirect report to manager Harry.

This process can repeat until all direct and indirect reports have been identified for manager Harry. The DN for user Joe can be used to search the manager Catalog Table of FIG. 14B to identify any direct reports to Joe, which would another level of indirect reports to manager Harry. Here, it can be seen that the DN for user Joe does not appear in the Attrvalue column of the Manager Catalog Table of FIG. 14B. Hence, the search does not find any direct reports for Joe, and therefore, does not find any additional levels of indirect reports for manager Harry.

This process can also be performed to identify memberships of groups, even if the group membership information is an implicit hierarchy within the DIT. For example, consider if it is desired to identify the email addresses of all direct and indirect members of the Group B (entry 163) in DIT 151b of FIG. 2A. This is a query against the implicit hierarchy shown in FIG. 2B, which does not explicitly exist in the DIT 151b of FIG. 2A.

This can be accomplished by querying against the Group Catalog Table of FIG. 14D and the Norm DN Catalog Table of FIG. 14C. The Norm DN Catalog Table is accessed to identify the EID of the subject for this query. Here, the subject of the query is Group B, which has the DN "cn=GroupB, c=Japan, o=Foo". The relevant row 2017 in the Norm DN Catalog Table is the following:

| EID | AttrValue |
|---|---|
| 163 | cn=groupb, c=japan, o=foo |

This row 2017 identifies the EID for Group B as having the value "163". This EID value is used to access the relevant row(s) in the Group Catalog Table of FIG. 14D to identify the members of this group. Here, the relevant rows 2020 and 2022 for this EID value in the Group Catalog Table are the following:

| EID | AttrValue |
|---|---|
| 163 | cn=groupa, c=us, o=foo |
| 163 | cn=harry, c=us, o=foo |

These rows identify the DN values for the direct members of Group B. Here the direct members of Group B are Harry and Group A.

The next step is to identify the indirect members of the Group. Using the identified DN values for the direct members of the group, the EID values for each are identified. These EID values can be found from accessing the Norm DN Catalog Table of FIG. 14C. Here, the relevant rows 2016 and 2019 for these DN values from the Norm DN Catalog Table are:

| EID | AttrValue |
|---|---|
| 159 | cn=harry, c=us, o=foo |
| 165 | cn=groupa, c=us, o=foo |

These rows identify the EID value for Harry as "159" and the EID value for Group A as "165". These EID values can be used to identify the relevant email addresses for these entries by accessing the Email Catalog Table of FIG. 14A. By searching against these EID values, the following row 1938 can be found in the Attribute Store Table:

| EID | AttrName | AttrVal |
|---|---|---|
| 159 | email | harry@foo |

This provides the email address value for the identified entry for Harry. It is noted that the found entry Group A does not contain an email address attribute, and therefore will not have an email attribute value in this table.

These EID values are also used to access the relevant row(s) in the Group Catalog Table to identify the members of these groups (if any), which would constitute indirect members of the Group B. Here, the EID value "159" for Harry does not appear in the Group Catalog table. This indicates that the entry for Harry does not contain any sub-groups having indirect members of Group B. However, the EID value "165" for entry Group A corresponds to the following rows 2024 and 2026 in the Group Catalog Table:

| EID | AttrValue |
|---|---|
| 165 | cn=Tom, c=US, o=Foo |
| 165 | cn=Joe, c=Japan, o=Foo |

These rows identify the DN values for the members of Group A, who would constitute indirect members of Group B. These DN values can be used to identify the EID values for these entries. The EID values can be found from accessing the Norm DN Catalog Table of FIG. 14C. Here, the relevant rows 2014 and 2018 for these DN values from the Norm DN Catalog Table are:

| EID | AttrValue |
|---|---|
| 157 | cn=tom, c=us, o=foo |
| 161 | cn=joe, c=japan, o=foo |

These rows identify the EID value for Tom as "157" and the EID value for Joe as "161". These EID values can be used to identify the relevant email addresses for these entries by accessing the Email Catalog Table of FIG. 14A. By searching against these EID values, the following rows 1934 and 1944 can be found in the Attribute Store Table:

| EID | AttrName | AttrVal |
|---|---|---|
| 157 | email | Tom@Foo |
| 161 | email | Joe@Foo |

The process is repeated until all of the direct and indirect members of the subject group have been identified.

The present process can also be used to perform a query of group objects in the bottom-up direction. An example of this would be a query that, for a particular user, seeks all groups for which the subject user is a member of those groups. The approach of the process shown in FIG. 15B can be used to make this type of query against the implicit hierarchy for the group objects.

These types of queries can be used to implement a "dynamic mailing list", e.g., a mailing list that sends emails to all the users under a particular manager. The significance of a dynamic mailing list is that it is based on an hierarchy and is therefore self-maintaining. Therefore, a query of the implicit hierarchy for the attribute of interest can be used to identify the members of the dynamic mailing list. This is far more efficient than the conventional approach of requiring manual maintenance of a mailing list to preserve an up-to-date list of all direct and indirect members of the list.

It is also noted that multiple dimensions of implied relationships can be queried with the present invention. This is accomplished using the process of FIGS. 15A-B by identifying the appropriate catalog tables corresponding to the multiple dimensions, and querying against these identified catalog tables. For example, assume that a desired query will need to reference implied queries for both the manager attribute as well as the group attribute. In this case, both the manager catalog table as well as the group catalog tables are identified to access both implied hierarchies, and a join and/or union operation can be performed to produce a unified set of results.

A query template can be used to generate a query against an implicit hierarchy. In one embodiment, the resulting query is a single SQL statement that can be used to provide the direct and indirect entries corresponding to the subject of the query.

In an embodiment, a typical SQL Query for querying implicit hierarchies has the following structure.

```
SELECT [HINT COND] [SELECT LIST]
FROM [FROM TABLES]
WHERE [ENTRYID CLAUSE]
AND   [DNCOND]
AND   [REQD ATTRIBUTE]
```

This following describe the parameters that may be used in conjunction with this structure:

1. [HINT COND] - This specifies one or more hints for SQL Optimizer to choose the right execution plan for this particular Query. This could include, for example, hints regarding best or preferred access paths to be selected by the optimizer. An example would be the following:
   [HINT COND] ::= /*+ INDEX(store EI__ATTRSTORE) USE__NL(store) */
2. [SELECT LIST] - This specifies the columns that need to be fetched to satisfy the query. The following is an example in which the ED, attribute name, and attribute value columns of the attribute store table (e.g., FIG. 13) are accessed:
   [SELECT LIST] ::= ATTRSTORE.entryid, ATTRSTORE.attrname, ATTRSTORE.attrval
3. [FROM TABLES] - This specifies the list of tables in the query. The following is an example in which the Attribute Store table (e.g., FIG. 13 and given alias "store") and the Norm DN Catalog Table (e.g., FIG. 14C and given the alias "DN") are accessed:
   [FROM TABLES] ::= ATTRSTORE store ct__DN DN
4. [ENTRYID CLAUSE] - This specifies the condition for selecting appropriate objects in the main table, e.g., the Attribute Store Table of FIG. 13. The following is an example in which the EID value in the main table is compared against the results of a subquery.
   [ENTRYID CLAUSE]::= store.entryid IN ( [SUBQUERY] )
5. [DNCOND] - This specifies the DN condition so that appropriate scope condition can be enforced. The following is an example format for this condition clause:
   [DNCOND]::= [DNCOND SUBTREE] or [DN COND ONELEVEL]
   The following are examples of this type of clause:
   [DNCOND SUBTREE]::=
      DN.parentDN like '<reversed base query DN>' OR DN.rDN = '<rDN of base of the query>' AND DN.parentDN = '<reversed parent DN of the base of the query>'
   [DN COND ONELEVEL]::= DN.parentDN = '<reverse base query DN>'
6. [REQD ATTR] - This specifies the list of attributes that is requested in the query. In an embodiment, the default would be all attributes. The following is an example format for this clause:
   [REQD ATTR]::= store.attrname IN (:an0, :an1, :an2, . . .)
7. [SUBQUERY] - This specifies the Sub query condition based on results for the appropriate objects fetched from Attribute Store Table. The following are example formats for this type of clause:
   [SUBQUERY] ::=    SELECT [SUBQ HINT COND]
                    [SUBQ SELECT LIST]
                    FROM [SUBQ TABLES]
                    WHERE [JOIN COND]
                    START WITH [BEGIN COND]
                    CONNECT BY [RELATIONSHIP COND]
   [SUBQ HINT COND] ::=
   /*+ USE__NL(at1) INDEX(at1 ST__NORM__DN) INDEX(at2 VA__<attributeName>)
   */
   [SUBQ SELECT LIST] ::= at1.entryid
   [SUBQ TABLES]::= CT__ORCLNORMDN at1, CT__<attributeName> at2
   Here Attribute is the name of the attribute used in the LDAP filter based on which the implicit hierarchy will be computed.
   Eg. Manager etc.
   [JOIN COND]::= at1.entryid = at2.entryid
   [BEGIN COND] - Specifies the starting value or the root of the implicit hierarchy.
   at2.attrvalue = '<DN of the starting value in the hierarchy>'
   [RELATIONSHIP COND] - Specifies the condition on which the parent child relations is setup.
   PRIOR at1.attrvalue = at2.attrvalue To illustrate this aspect of the invention, consider if it is desired to query all people who report directly or indirectly to the entry having the DN "cn=Harry, c=US, o=Foo". The corresponding LDAP query will be the following:
Ldapsearch   -C-p<port>-h<host>-b   ""-s   sub "manager=cn=Harry, c=US, o=Foo"The -C option in the above query is a special LDAP control that tells the LDAP server to perform a hierarchical query on the data where the entries are connect by manager attribute and the starting value or the root of the hierarchy is "cn=Harry, c=us, o=Foo". Such a query would return all entries who directly or indirectly report to "Harry" or in other words, whose direct or indirect manager is "Harry". Ldapsearch -p<port>-h<host>-b""-s sub "manager cn=Harry, c=US, o=Foo"

The ldap search command as shown above only queries for those directory objects who directly report to 'Harry' i.e. those directory objects where manager attribute value is "cn=Harry, c=US, o=Foo". Note: this query does not return the entire hierarchy or "Harry's" organization structure.

Using the above SQL template format, the SQL Query generated from templates above is as follows:

```
SELECT /*+ USE__NL(store) INDEX(store ATTRSTORE) */
store.entryid, store.attrname, store.attrval
FROM attrstore store
WHERE store.entryid IN (
   SELECT /*+ USE__NL(at1) INDEX(at1 NORMDN)
   INDEX(at2 manager) */
   at1.entryid
   FROM ct__normDN at1, ct__manager at2
   WHERE at1.entryid = at2.entryid
   START WITH at2.attrvalue = 'cn=harry, c=us, o=foo'
   CONNECT BY PRIOR at1.attrvalue = at2.attrvalue
)
```

In this example, "attrstore" refers to the Attribute Store Table, "ct_normDN" refers to the Norm DN Catalog Table, and "ct_manager" refers to the Manager Catalog Table.

As another example, consider a query for all groups that a user, cn=harry, c=us, o=foo, is a member of and return only the displayName of those groups. The following is an example of a corresponding LDAP filter for this query:
Ldapsearch   -C-p<port>-h<host>-b""-s   sub "uniquemember=cn=Harry,   c=US,   o=Foo"   "displayName"

The SQL Query generated from above templates is as follows—

```
SELECT /*+ USE__NL(store) INDEX(store ATTRSTORE) */
store.entryid, store.attrname, store.attrval
FROM ds__attrstore store
WHERE store.entryid IN (
   SELECT /*+ USE__NL(at1) INDEX(at1 NORMDN)
   INDEX(at2 uniquemember)
   */ at1.entryid
   FROM ct__normDN at1, ct__manager at2
   WHERE at1.entryid = at2.entryid
   START WITH at2.attrvalue = 'cn=harry, c=us, o=foo'
   CONNECT BY PRIOR at1.attrvalue = at2.attrvalue
)
AND
Store.attrname in ('displayName');
```

Figure 16:
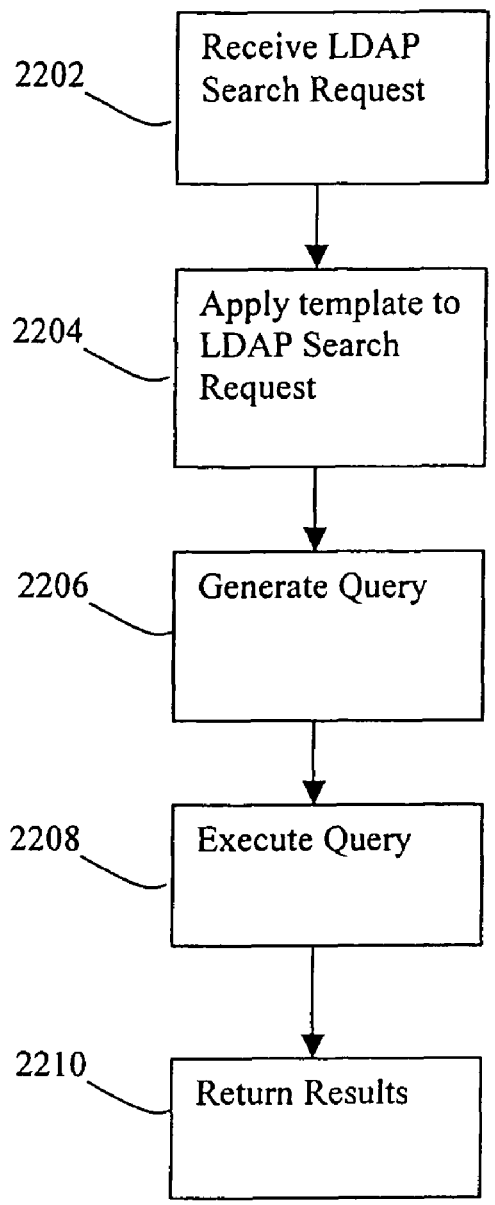
FIG. 16 is a flow diagram of a process to generate a query statement for querying an implicit hierarchy and executing the query statement according to an embodiment of the invention.
Figure 18:
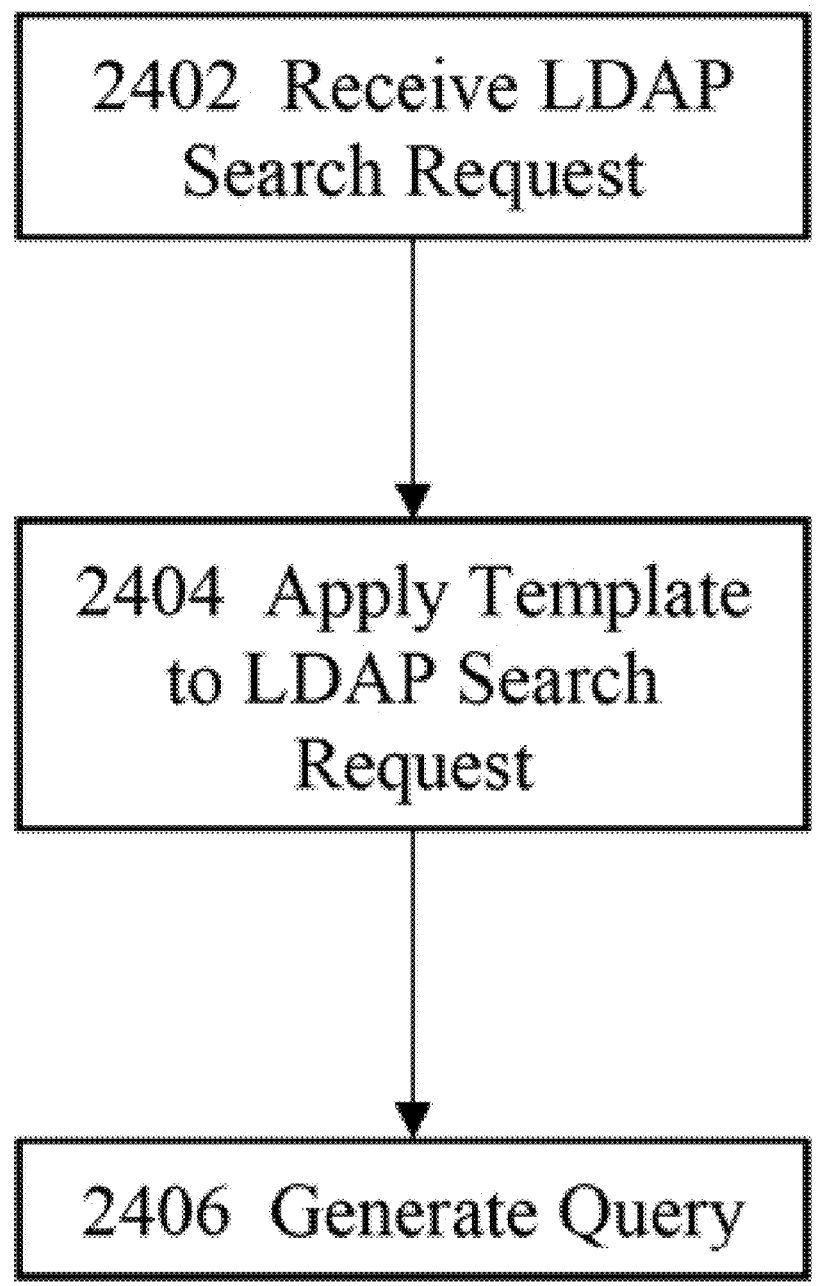
FIG. 18 illustrates a flow diagram of a process for generating a statement in a database query language.

FIG. 16 shows a flowchart of a process for generating a query to perform a query against an implicit hierarchy. At 2202, the LDAP search filter is received that seeks a query of an implicit hierarchy. As noted above, such an implicit hierarchy is not explicitly represented in the directory representation of the sought data, e.g., the implicit hierarchy is not represented in the pathname of the objects that is the subject of the query. At 2204 and 2206, the LDAP filter is transformed into a query of the appropriate query language to seek the desired information. In one embodiment, a template is used to generate a single SQL statement corresponding to the LDAP filter. At 2208, the query statement is executed. The results are returned to the client at 2210. FIG. 18 shows a flowchart of a process for generating a query to perform a query against an implicit hierarchy. At 2402, the LDAP search filter is received that seeks a query of an implicit hierarchy. As noted above, such an implicit hierarchy is not explicitly represented in the directory representation of the sought data, e.g., the implicit hierarchy is not represented in the pathname of the objects that is the subject of the query. At 2404 and 2406, the LDAP filter is transformed into a query of the appropriate query language to seek the desired information. In one embodiment, a template is used to generate a single SQL statement corresponding to the LDAP filter.

Therefore, what has been described is a method and system for querying an implicit hierarchy. One notable advantages of this approach is that a single query can be formed for any type of hierarchical query. In addition, the same mechanism can be used to represent a dynamic group in the directory system. These dynamic groups can be used for various purposes, such as an email distribution list. Moreover, this approach can improve query performance since it can avoid performing recursive queries to compute a user's membership into privilege groups. Therefore, the present approach provides significant scalability and performance advantages.

SYSTEM ARCHITECTURE OVERVIEW

Figure 17:
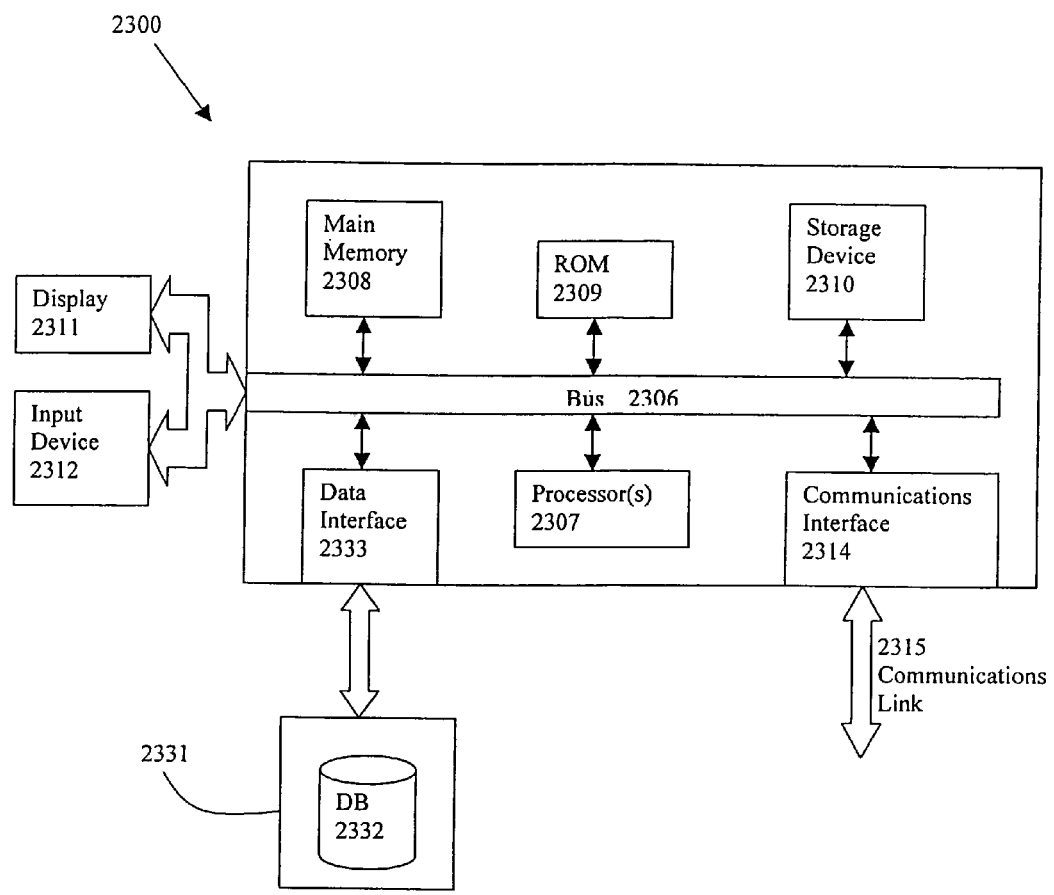
FIG. 17 is a diagram of an system architecture with which the present invention can be implemented.

The execution of the sequences of instructions required to practice the invention may be performed in embodiments of the invention by a computer system 2300 as shown in FIG. 17. As used herein, the term computer system 2300 is broadly used to describe any computing device that can store and independently run one or more programs. In an embodiment of the invention, execution of the sequences of instructions required to practice the invention is performed by a single computer system 2300. According to other embodiments of the invention, two or more computer systems 2300 coupled by a communication link 2315 may perform the sequence of instructions required to practice the invention in coordination with one another. In order to avoid needlessly obscuring the invention, a description of only one computer system 2300 will be presented below; however, it should be understood that any number of computer systems 2300 may be employed to practice the invention.

Each computer system 2300 may include a communication interface 2314 coupled to the bus 2306. The communication interface 2314 provides two-way communication between computer systems 2300. The communication interface 2314 of a respective computer system 2300 transmits and receives signals, e.g., electrical, electromagnetic or optical signals, that include data streams representing various types of information, e.g., instructions, messages and data. A communication link 2315 links one computer system 2300 with another computer system 2300. A computer system 2300 may transmit and receive messages, data, and instructions, including program, i.e., application, code, through its respective communication link 2315 and communication interface 2314. Received program code may be executed by the respective processor(s) 2307 as it is received, and/or stored in the storage device 2310, or other associated non-volatile media, for later execution.

In an embodiment, the computer system 2300 operates in conjunction with a data storage system 2331, e.g., a data storage system 2331 that contains a database 2332 that is readily accessible by the computer system 2300. The computer system 2300 communicates with the data storage system 2331 through a data interface 2333. A data interface 2333, which is coupled to the bus 2306, transmits and receives signals, e.g., electrical, electromagnetic or optical signals, that include data streams representing various types of signal information, e.g., instructions, messages and data. In embodiments of the invention, the functions of the data interface 2333 may be performed by the communication interface 2314.

Computer system 2300 includes a bus 2306 or other communication mechanism for communicating instructions, messages and data, collectively, information, and one or more processors 2307 coupled with the bus 2306 for processing information. Computer system 2300 also includes a main memory 2308, such as a random access memory (RAM) or other dynamic storage device, coupled to the bus 2306 for storing dynamic data and instructions to be executed by the processor(s) 2307. The main memory 2308 also may be used for storing temporary data, i.e., variables, or other intermediate information during execution of instructions by the processor(s) 2307. The computer system 2300 may further include a read only memory (ROM) 2309 or other static storage device coupled to the bus 2306 for storing static data and instructions for the processor(s) 2307. A storage device 2310, such as a magnetic disk or optical disk, may also be provided and coupled to the bus 2306 for storing data and instructions for the processor(s) 2307. A computer system 2300 may be coupled via the bus 2306 to a display device 2311, such as, but not limited to, a cathode ray tube (CRT), for displaying information to a user. An input device 2312, e.g., alphanumeric and other keys, is coupled to the bus 2306 for communicating information and command selections to the processor(s) 2307.

According to one embodiment of the invention, an individual computer system 2300 performs specific operations by their respective processor(s) 2307 executing one or more sequences of one or more instructions contained in the main memory 2308. Such instructions may be read into the main memory 2308 from another computer-usable medium, such as the ROM 2309 or the storage device 2310. Execution of the sequences of instructions contained in the main memory 2308 causes the processor(s) 2307 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 2307. Such a medium may take many forms, including, but not limited to, non-volatile and volatile media. Non-volatile media, i.e., media that can retain information in the absence of power, includes the ROM 2309, CD ROM, magnetic tape, and magnetic discs. Volatile media, i.e., media that can not retain information in the absence of power, includes the main memory 2308.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for generating a statement in a database query language to search against an implicit hierarchy of directory information objects stored in a relational database, comprising:
    receiving a search request that searches for directory information pertaining to an implicit hierarchy, wherein the implicit hierarchy is a hierarchical relationship that is not explicitly represented in a directory information tree for the directory information and in which the statement comprises a SQL statement;
    generating a statement in a database query language that searches for the directory information objects stored in the relational database, the statement being generated from one or more templates corresponding to search conditions in the search request, wherein the act of generating the statement is performed by a processor; and
    storing the statement in a volatile or non-volatile computer readable medium or displaying the statement on a display apparatus.

2. The method of claim 1 in which the implicit hierarchy does not correspond to the pathname of the directory information objects.

3. The method of claim 1 in which the directory information objects comprise group objects.

4. The method of claim 3 in which attribute information for the members of the group objects are queried.

5. The method of claim 4 in which the attribute information comprise email information.

6. The method of claim 4 in which the attribute information comprise authorization or authentication information.

7. The method of claim 1 in which the search request seeks both direct and indirect relationships within the implicit hierarchy.

8. The method of claim 1 in which the statement comprises at most one SQL statement.

9. The method of claim 1 in which the directory information objects comprise LDAP objects.

10. The method of claim 1 in which the search request is an LDAP search filter.

11. The method of claim 1 in which the one or more templates comprise a base template comprising a header section, a body section, and a closing section, and the method further comprising:
    generating a first set of query statements to fill in the header section;
    generating a second set of query statements to fill in the body section; and
    generating a third set of query statements to fill in the closing section.

12. The method of claim 11 in which the first set of query statements identifies database tables to be accessed.

13. The method of claim 12 in which the database tables include a database table that stored object attribute information.

14. The method of claim 12 in which the database tables include a database table that stores distinguished names information.

15. The method of claim 11 in which the second set of query statements identifies one or more catalog tables to access.

16. The method of claim 1 in which the one or more templates access a normalized name table to identify an identifier for a subject of the search request.

17. The method of claim 1 in which one or more catalog tables are accessed by the statement.

18. The method of claim 17 in which multiple identifiers for subjects are sought in the one or more catalog tables to query indirect attributes in the implicit hierarchy.

19. The method of claim 1 in which at least one of the one or more templates have the form:

```
SELECT [HINT COND] [SELECT LIST]
FROM [FROM TABLES]
WHERE [ENTRYID CLAUSE]
AND    [DNCOND]
AND    [REQD ATTRIBUTE].
```

20. The method of claim 19 in which [HINT COND] specifies one or more hints for a SQL optimizer.

21. The method of claim 19 in which [SELECT LIST] specifies the columns to be fetched.

22. The method of claim 19 in which [FROM TABLES] specifies a list of tables in the query.

23. The method of claim 19 in which [ENTRYID CLAUSE] specifies condition for selecting appropriate objects in a main attribute storage table.

24. The method of claim 19 in which [DNCOND] specifies a condition so that appropriate scope condition can be enforced.

25. The method of claim 19 in which [REQD ATTR] specifies a list of attributes that is requested in the query.

26. The method of claim 19 in which [SUBQUERY] specifies a subquery condition based on results for fetched objects.

27. A volatile or non-volatile computer usable medium, the volatile or non-volatile computer usable medium comprising a sequence of instructions which, when executed, causes the execution of a process for generating a statement in a database query language to search against an implicit hierarchy of directory information objects stored in a relational database, the process comprising:
    receiving a search request that searches for directory information pertaining to an implicit hierarchy, wherein the implicit hierarchy is a hierarchical relationship that is not explicitly represented in a directory information tree for the directory information and in which the statement comprises a SQL statement; and
    generating a statement in a database query language that searches for the directory information objects stored in the relational database, the statement being generated from one or more templates corresponding to search conditions in the search request, wherein the act of generating the statement is performed by a processor; and
    storing the statement in a volatile or non-volatile computer readable medium or displaying the statement on a display apparatus.

28. The volatile or non-volatile computer usable medium of claim 27 in which the implicit hierarchy does not correspond to the pathname of the directory information objects.

29. The volatile or non-volatile computer usable medium of claim 27 in which the directory information objects comprise group objects.

30. The volatile or non-volatile computer usable medium of claim 27 in which the search request seeks both direct and indirect relationships within the implicit hierarchy.

31. The volatile or non-volatile computer usable medium of claim 27 in which the directory information objects comprise LDAP objects.

32. The volatile or non-volatile computer usable medium of claim 27 in which the search request is an LDAP search filter.

33. The volatile or non-volatile computer usable medium of claim 27 in which the one or more templates comprise a base template comprising a header section, a body section, and a closing section, and the method further comprising:
- generating a first set of query statements to fill in the header section;
- generating a second set of query statements to fill in the body section; and
- generating a third set of query statements to fill in the closing section.

34. The volatile or non-volatile computer usable medium of claim 27 in which the one or more templates access a normalized name table to identify an identifier for a subject of the search request.

35. The volatile or non-volatile computer usable medium of claim 27 in which one or more catalog tables are accessed by the statement.

36. A system for generating a statement in a database query language to search against an implicit hierarchy of directory information objects stored in a relational database, comprising:
- means for receiving a search request that searches for directory information pertaining to an implicit hierarchy, wherein the implicit hierarchy is a hierarchical relationship that is not explicitly represented in a directory information tree for the directory information and in which the statement comprises a SQL statement;
- means for generating a statement in a database query language that searches for the directory information objects stored in the relational database, the statement being generated from one or more templates corresponding to search conditions in the search request, wherein the means for generating the statement comprises a processor; and
- a volatile or non-volatile computer readable medium configured for storing the statement-or a display apparatus configured for displaying the statement.

37. The system of claim 36 the implicit hierarchy does not correspond to the pathname of the directory information objects.

38. The system of claim 36 in which the directory information objects comprise group objects.

39. The system of claim 36 in which the search request seeks both direct and indirect relationships within the implicit hierarchy.

40. The system of claim 36 in which the directory information objects comprise LDAP objects.

41. The system of claim 36 in which the search request is an LDAP search filter.

42. The system of claim 36 in which the one or more templates comprise a base template comprising a header section, a body section, and a closing section, and the system further comprising:
- means for generating a first set of query statements to fill in the header section;
- means for generating a second set of query statements to fill in the body section; and
- means for generating a third set of query statements to fill in the closing section.

43. The system of claim 36 in which the one or more templates access a normalized name table to identify an identifier for a subject of the search request.

44. The system of claim 36 in which one or more catalog tables are accessed by the statement.

* * * * *